US010473224B2

(12) United States Patent
Nakanishi

(10) Patent No.: US 10,473,224 B2
(45) Date of Patent: Nov. 12, 2019

(54) CHECK VALVE AND VALVE BODY

(71) Applicant: Tacmina Corporation, Osaka (JP)

(72) Inventor: Syunsuke Nakanishi, Asago (JP)

(73) Assignee: Tacmina Corporation, Osaka (JP)

(*) Notice: Subject to any disclaimer, the term of this patent is extended or adjusted under 35 U.S.C. 154(b) by 0 days.

(21) Appl. No.: 15/560,855

(22) PCT Filed: Mar. 24, 2016

(86) PCT No.: PCT/JP2016/059471
§ 371 (c)(1),
(2) Date: Sep. 22, 2017

(87) PCT Pub. No.: WO2016/153004
PCT Pub. Date: Sep. 29, 2016

(65) Prior Publication Data
US 2018/0119833 A1    May 3, 2018

(30) Foreign Application Priority Data

Mar. 25, 2015 (JP) ................................. 2015-062540

(51) Int. Cl.
*F16K 15/14* (2006.01)
*F16K 27/02* (2006.01)
(Continued)

(52) U.S. Cl.
CPC ............ *F16K 15/144* (2013.01); *F04B 13/00* (2013.01); *F04B 43/02* (2013.01); *F04B 45/04* (2013.01);
(Continued)

(58) Field of Classification Search
CPC ... F16K 7/12; F16K 7/123; F16K 7/14; F16K 7/17; F16K 15/14; F16K 15/144;
(Continued)

(56) References Cited

U.S. PATENT DOCUMENTS 3,077,205 A * 2/1963 Butterworth .......... F16K 15/144
137/512
3,508,576 A * 4/1970 Gross .................... F16K 15/144
137/512
(Continued)

FOREIGN PATENT DOCUMENTS

CN    1826465 A      8/2006
DE    1181015 B  * 11/1964 ........... F16K 15/144
(Continued)

*Primary Examiner* — Reinaldo Sanchez-Medina
*Assistant Examiner* — Hailey K. Do
(74) *Attorney, Agent, or Firm* — The Webb Law Firm

(57) ABSTRACT

Disclosed is a check valve reliably closing a fluid path without the need of machining with high accuracy. The check valve includes a pair of members with clamping surfaces; and a valve body clamped by the clamping surfaces from both sides in a thickness direction of the valve body. The valve body is formed from an elastic body and includes an outer frame, a sealing part arranged inside the outer frame and configured to open and close a fluid path formed in one of the pair of members, and a coupling part configured to allow fluid to pass therethrough in the thickness direction and configured to couple the outer frame and the sealing part to each other. The outer frame has a thickness larger than an interplane dimension between the clamping surfaces when the pair of members are joined together.

12 Claims, 40 Drawing Sheets

(51) Int. Cl.
   *F04B 43/02*   (2006.01)
   *F04B 45/04*   (2006.01)
   *F04B 53/10*   (2006.01)
   *F04B 13/00*   (2006.01)

(52) U.S. Cl.
   CPC ........ *F04B 53/102* (2013.01); *F04B 53/1072* (2013.01); *F16K 27/0209* (2013.01); *Y10T 137/7843* (2015.04); *Y10T 137/7895* (2015.04)

(58) Field of Classification Search
   CPC .... F16K 15/145; F16K 15/147; F16K 15/202; F16K 7/20; F16K 11/105; F16K 31/126; F16K 31/365; Y10T 137/7843; Y10T 137/784; Y10T 137/7895; Y10T 137/7887
   See application file for complete search history.

(56) References Cited

U.S. PATENT DOCUMENTS

| | | | | |
|---|---|---|---|---|
| 4,493,339 | A * | 1/1985 | Porter, Jr. | A61M 16/208 128/205.24 |
| 4,712,583 | A * | 12/1987 | Pelmulder | A61M 39/24 137/494 |
| 5,697,770 | A * | 12/1997 | Schulz | F02M 37/046 417/560 |
| 7,721,763 | B2 * | 5/2010 | Choksi | F16K 15/144 137/515.5 |
| 7,762,796 | B2 | 7/2010 | Hargraves et al. | |
| 8,627,852 | B2 * | 1/2014 | Hatton | B60P 7/065 137/224 |
| 9,046,182 | B2 | 6/2015 | Fukano et al. | |
| 9,421,354 | B2 | 8/2016 | Carmody et al. | |
| 9,593,780 | B2 | 3/2017 | Sasaki et al. | |
| 2004/0188541 | A1 * | 9/2004 | Maruyama | B60S 1/481 239/284.1 |
| 2006/0177330 | A1 | 8/2006 | Hargraves et al. | |
| 2009/0277166 | A1 * | 11/2009 | Walz | F02D 9/08 60/324 |
| 2013/0112302 | A1 | 5/2013 | Fukano et al. | |
| 2014/0128160 | A1 | 5/2014 | Gillet et al. | |
| 2014/0238497 | A1 * | 8/2014 | Jones | F16K 15/144 137/1 |
| 2015/0352349 | A1 | 12/2015 | Carmody et al. | |
| 2017/0187018 | A1 * | 6/2017 | Pflueger | F16K 15/144 |

FOREIGN PATENT DOCUMENTS

| | | | | |
|---|---|---|---|---|
| GB | 510052 | A * | 7/1939 | ........... F16K 15/144 |
| JP | 5480133 | U | 11/1952 | |
| JP | 200112356 | A | 1/2001 | |
| JP | 2012112419 | A | 6/2012 | |
| JP | 201396553 | A | 5/2013 | |
| WO | 2012140968 | A1 | 10/2012 | |
| WO | 2014107436 | A1 | 7/2014 | |

* cited by examiner

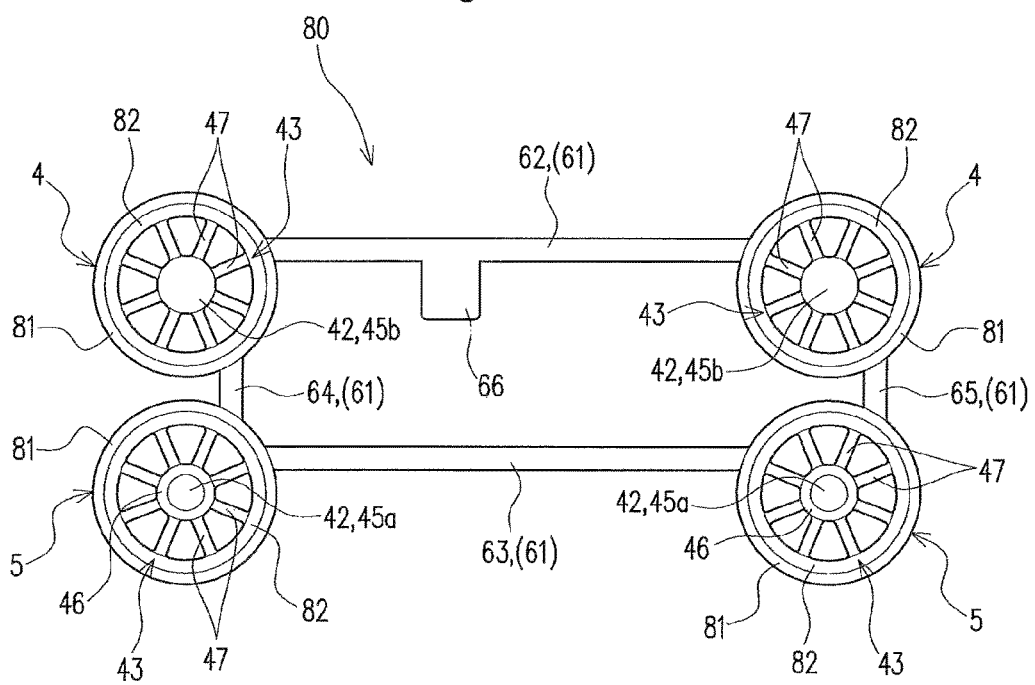

CHECK VALVE AND VALVE BODY

CROSS-REFERENCE TO RELATED APPLICATIONS

This application is the United States national phase of International Application No. PCT/JP2016/059471 filed Mar. 24, 2016, and claims priority to Japanese Patent Application No. 2015-062540 filed Mar. 25, 2015, the disclosures of which are hereby incorporated in their entirety by reference.

FIELD

The present invention relates to a check valve and a valve body.

BACKGROUND

As a check valve, a technique disclosed in Patent Literature 1 below, for example, has been proposed. The check valve of Patent Literature 1 includes a valve body and a receiving member. The valve body includes a ring-shaped contact part on the outer side, and a projection at the center inside the ring-shaped contact part, and the ring-shaped contact part and the projection are coupled to each other by a coupling part.

A fluid path (hole) is formed at the center of the receiving member. The ring-shaped contact part of the valve body is a portion that closely contacts the outer circumferential portion of the receiving member. The projection of the valve body is configured to make line contact with the entire circumference of the ridge line on the edge of the fluid path.

The check valve of Patent Literature 1 aims to enhance the degree of sealing of the fluid path by configuring the projection of the valve body so as to make line contact with the entire circumference of the ridge line on the edge of the fluid path formed in the receiving member.

CITATION LIST

Patent Literature

Patent Literature 1: JP 2001-12356 A

SUMMARY

Technical Problem

However, in order to allow the projection of the valve body in the check valve of Patent Literature 1 above to make line contact with the entire circumference of the ridge line on the edge of the fluid path formed in the receiving member, it is necessary to machine each of the valve body and the receiving member with high accuracy.

In view of the aforementioned problem, it is an object of the present invention to provide a check valve and a valve body capable of reliably closing a fluid path through which fluid passes without the need of machine with high accuracy.

Solution to Problem

The present invention is a check valve including: a pair of members including clamping surfaces; and a valve body clamped by the clamping surfaces from both sides in a thickness direction of the valve body, wherein the valve body includes an outer frame, a sealing part arranged inside the outer frame and configured to open and close a fluid path formed in one of the pair of members, and a coupling part configured to allow fluid to pass therethrough in the thickness direction and configured to couple the outer frame and the sealing part to each other, the outer frame, the sealing part, and the coupling part are formed from elastic bodies, the outer frame has a thickness set to be larger than an interplane dimension between the clamping surfaces when the pair of members are joined together, and when the pair of members are joined together, the sealing part is displaced toward one side in the thickness direction by elastic compressive deformation in the thickness direction of the outer frame clamped by the clamping surfaces of the pair of members.

According to the aforementioned configuration, the outer frame of the valve body is compressed and elastically deformed in the thickness direction by being pressed from both sides in the thickness direction by the two clamping surfaces, the elastic compressive deformation is transferred to the coupling part, and the sealing part is displaced toward the fluid path side by the amount corresponding to the elastic compressive deformation. That is, the sealing part is subjected to an elastic biasing force from the coupling part, and the sealing part is an elastic body. Therefore, the fluid path is stably closed by the sealing part without forming the sealing part and the fluid path with especially high accuracy.

The check valve of the present invention can employ a configuration in which the one of the pair of members includes a space with which the fluid path communicates and which allows the sealing part to be displaced toward the one side in the thickness direction by the elastic compressive deformation of the outer frame in the thickness direction, and the other of the pair of members includes a restricting part configured to restrict displacement of the sealing part toward the other side in the thickness direction.

According to the aforementioned configuration, the elastic compressive deformation caused by pressing the outer frame of the valve body from both sides in the thickness direction is transferred to the coupling part, the elastic compressive deformation is transferred to the sealing part via the coupling part, the displacement of the sealing part toward the other side in the thickness direction is restricted by the restricting part, and the fluid path is closed by the sealing part displaced toward the space on the one side in the thickness direction.

The check valve of the present invention can employ a configuration in which the coupling part is formed to have a smaller thickness than the outer frame. According to this configuration, the elastic compressive deformation of the outer frame is easily transferred to the coupling part. The thickness of the coupling part is set so that the elastic compressive deformation of the outer frame is easily transferred to the coupling part, and the posture of the sealing part closing the fluid path can be reliably maintained, on the condition of being smaller than the thickness of the outer frame.

The check valve of the present invention can employ a configuration in which the sealing part is formed to have a larger thickness than the coupling part. When the thickness of the sealing part is larger than the thickness of the coupling part as in this configuration, the rigidity of the sealing part is higher than the rigidity of the coupling part, and the behavior of the sealing part can be stabilized.

The present invention is a valve body including: an outer frame; a sealing part arranged inside the outer frame and configured to open and close a fluid path; and a coupling part configured to allow fluid to pass therethrough and configured to couple the outer frame and the sealing part to each other, wherein the outer frame, the sealing part, and the coupling part are formed from elastic bodies, and the outer frame has a thickness set to be larger than a dimension between opposed surfaces at mounting positions in a pair of members which are arranged to be opposed to each other and to which the valve body is mounted.

In the valve body with the aforementioned configuration, the outer frame has a thickness set to be larger than the dimension between the opposed surfaces at the mounting positions in the pair of members to which the valve body is mounted, and therefore when the outer frame is clamped by the opposed surfaces of the pair of members, the outer frame is compressed and elastically deformed in the thickness direction, and the elastic compressive deformation is transferred to the coupling part, so that the sealing part is displaced toward the one side in the thickness direction by the amount corresponding to the elastic compressive deformation.

The valve body of the present invention can employ a configuration in which the coupling part is formed so that the sealing part is located more on the one side in the thickness direction than the outer frame. According to this configuration, when the outer frame is compressed and elastically deformed in the thickness direction, the sealing part is easily displaced toward the one side in the thickness direction by the elastic compressive deformation.

The valve body of the present invention can employ a configuration in which the outer frame is formed into an annular shape, the coupling part is constituted by a plurality of connecting rods, and the connecting rods are radially arranged at equal intervals in a circumferential direction with the sealing part at the center.

As in the aforementioned configuration, the outer frame is formed into an annular shape, thereby allowing the amount of the elastic compressive deformation of the outer frame in the thickness direction to be uniform in the circumferential direction, and the connecting rods are radially arranged at equal intervals in the circumferential direction with the sealing part at the center, so that the amount of the elastic compressive deformation is uniformly distributed to the connecting rods, thereby allowing the sealing part to be entirely displaced toward the one side in the thickness direction in a certain posture.

Advantageous Effect of Invention

According to the check valve and the valve body of the present invention, it is possible to reliably close a fluid path through which fluid passes without the need of machining with high accuracy.

BRIEF DESCRIPTION OF DRAWINGS

FIG. 27 is a front view showing valve bodies (valve body group) according to a fifth embodiment of the present invention.

DESCRIPTION OF EMBODIMENTS

Figure 1:
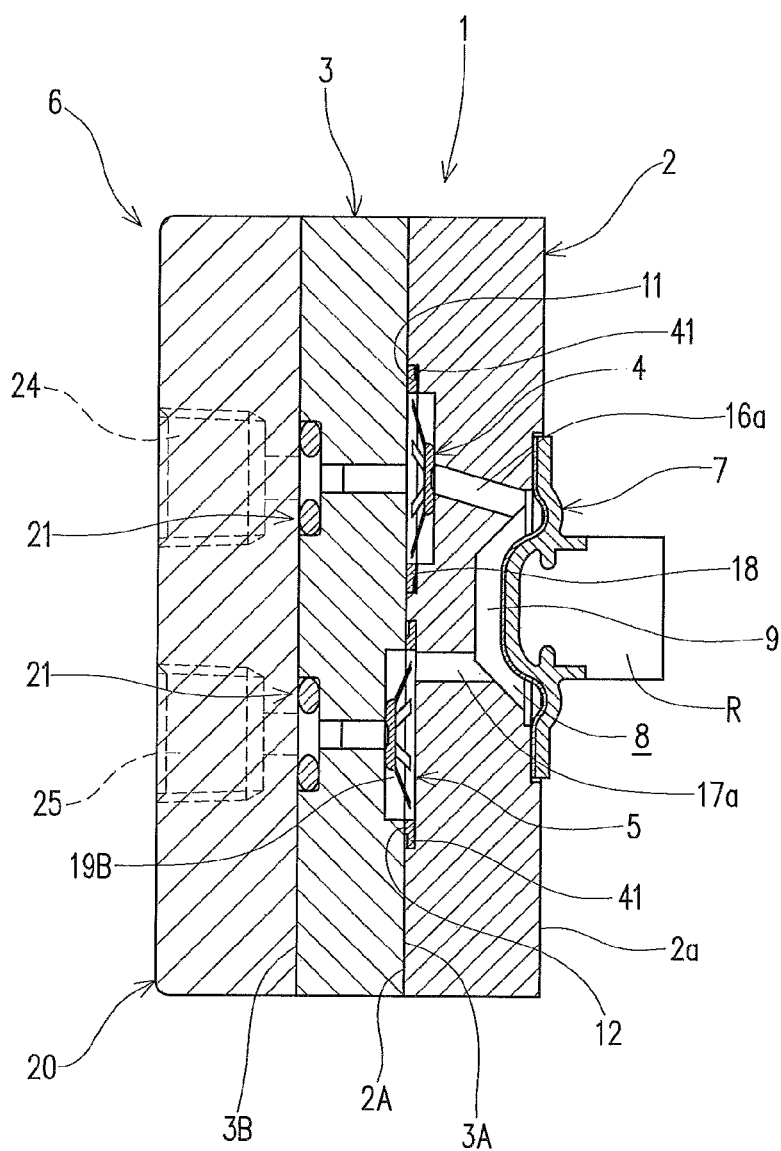
FIG. 1 is a sectional view of a pump head representing a check valve according to a first embodiment of the present invention.
Figure 2:
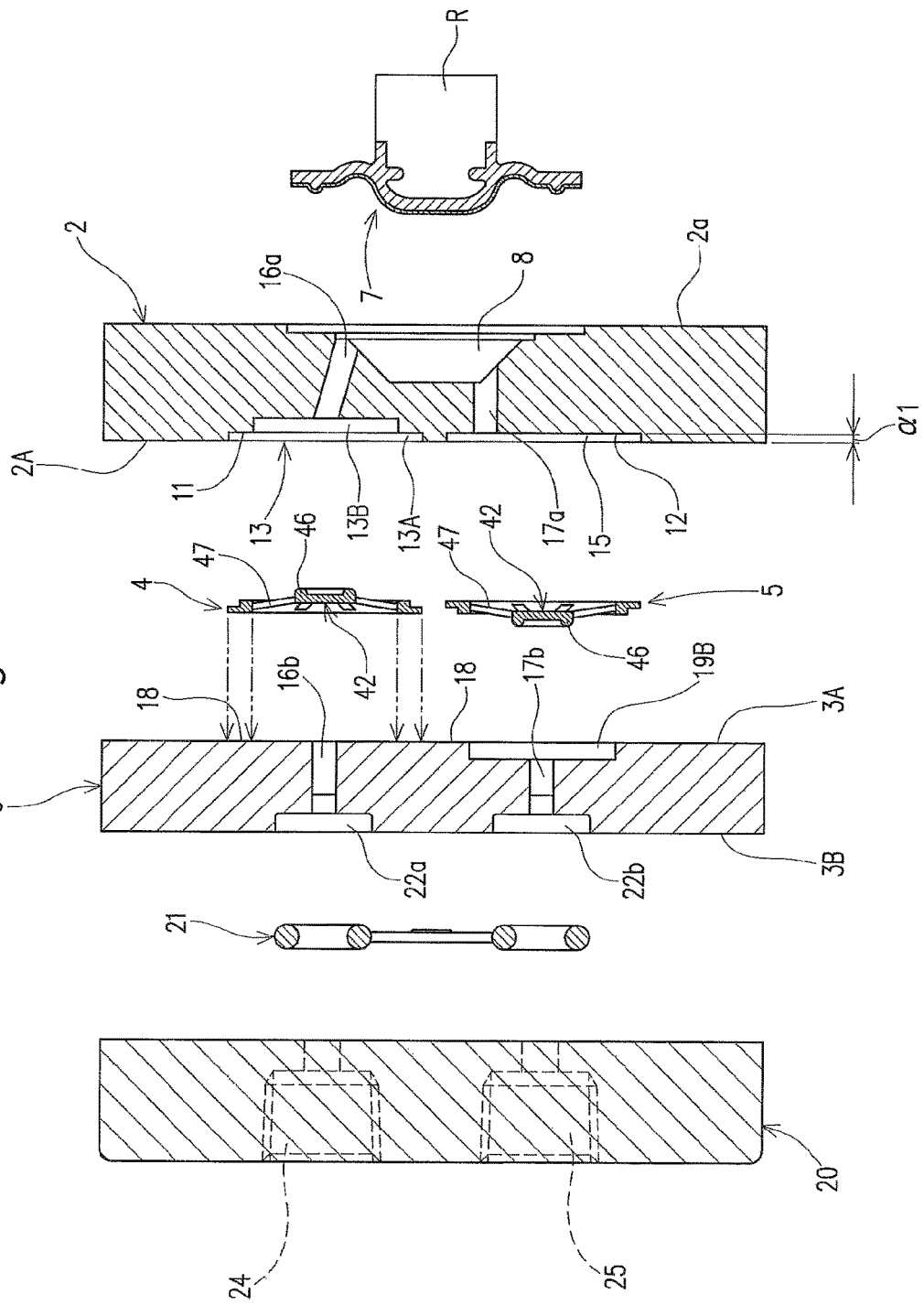
FIG. 2 is an exploded sectional view thereof.
Figure 3:
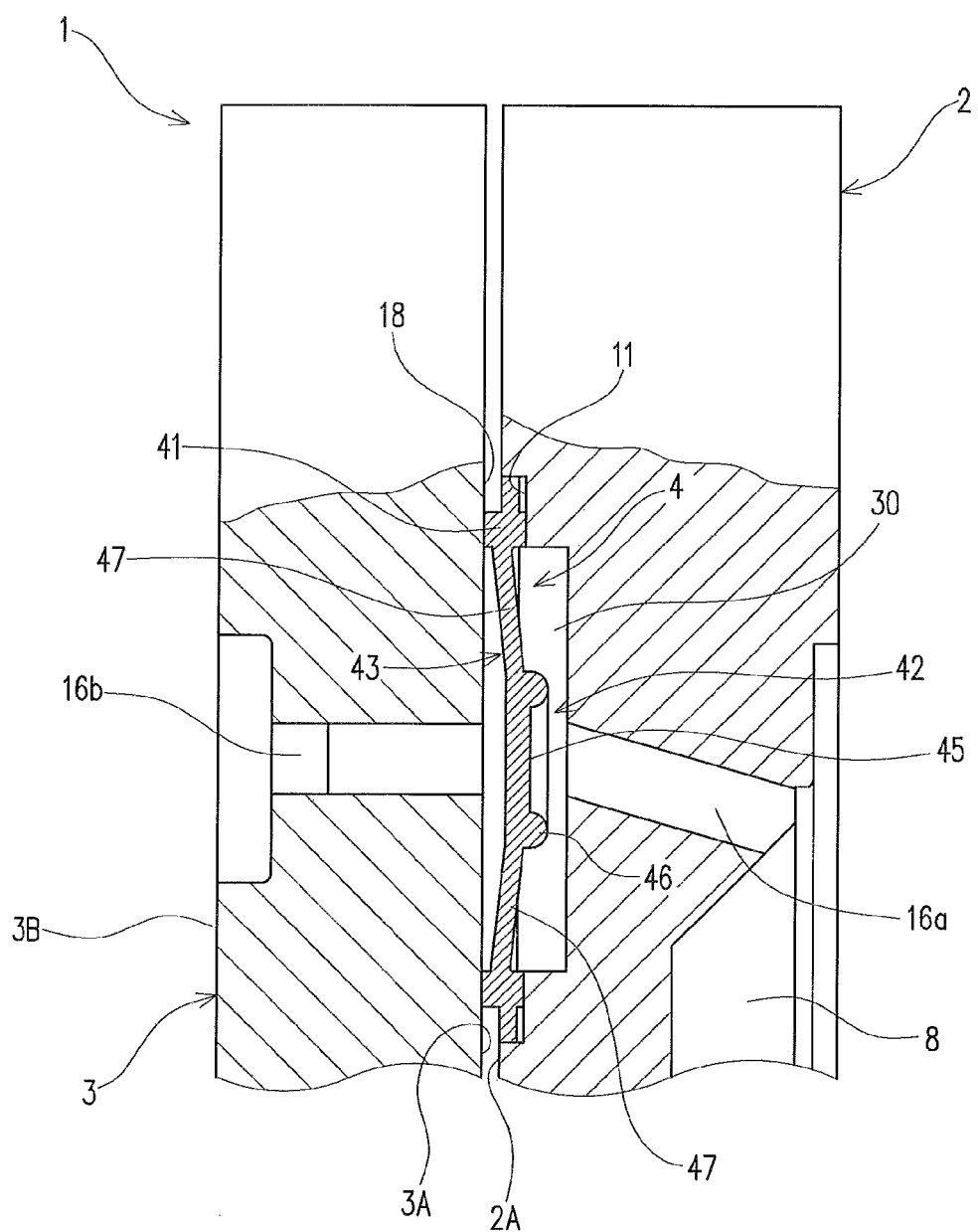
FIG. 3 is a sectional view thereof in the state where a valve body is clamped by a first plate member and a second plate member.
Figure 4:
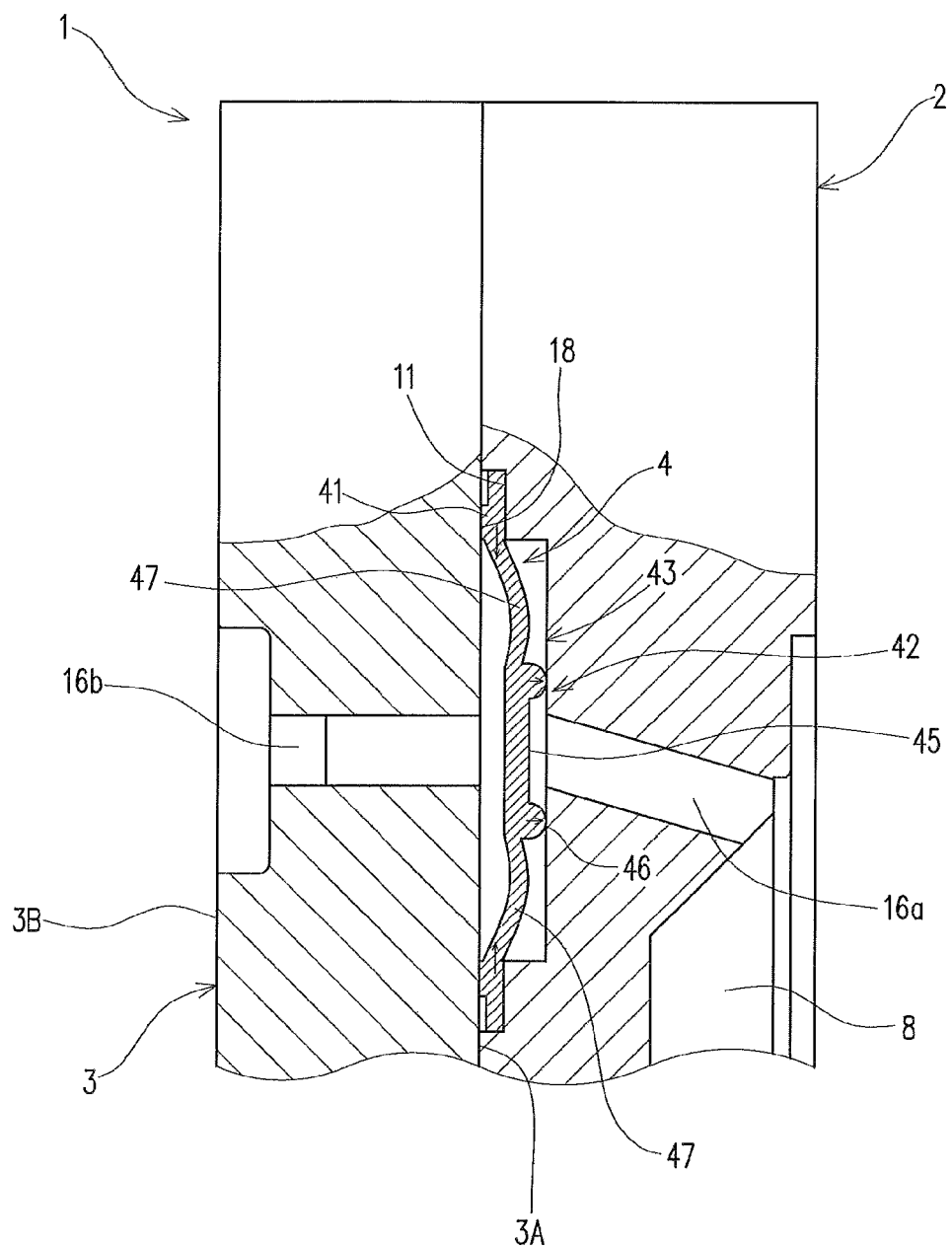
FIG. 4 is a sectional view thereof in the state where the valve body is clamped by the first plate member and the second plate member, so that an outer frame is elastically compressed.
Figure 5:
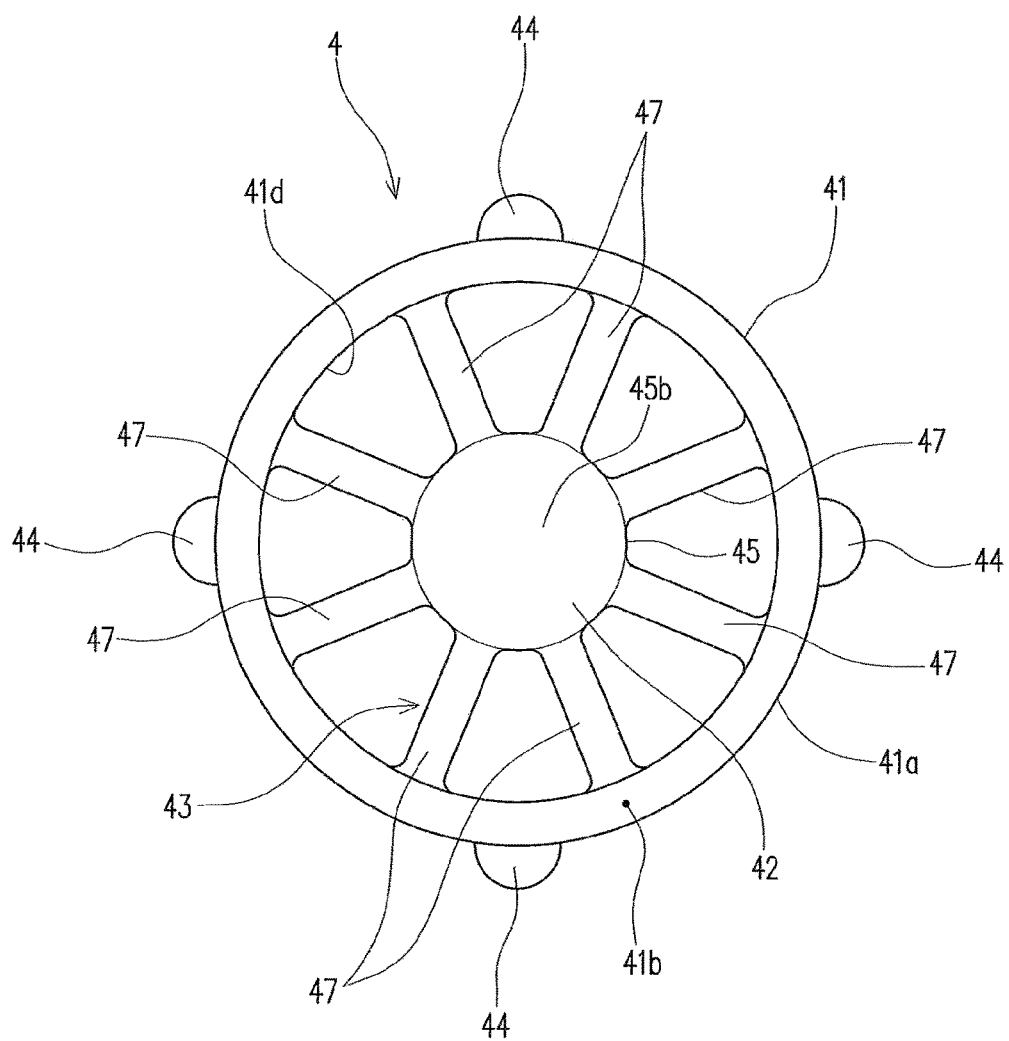
FIG. 5 is a view (front view) of the valve body thereof from one side.
Figure 6:
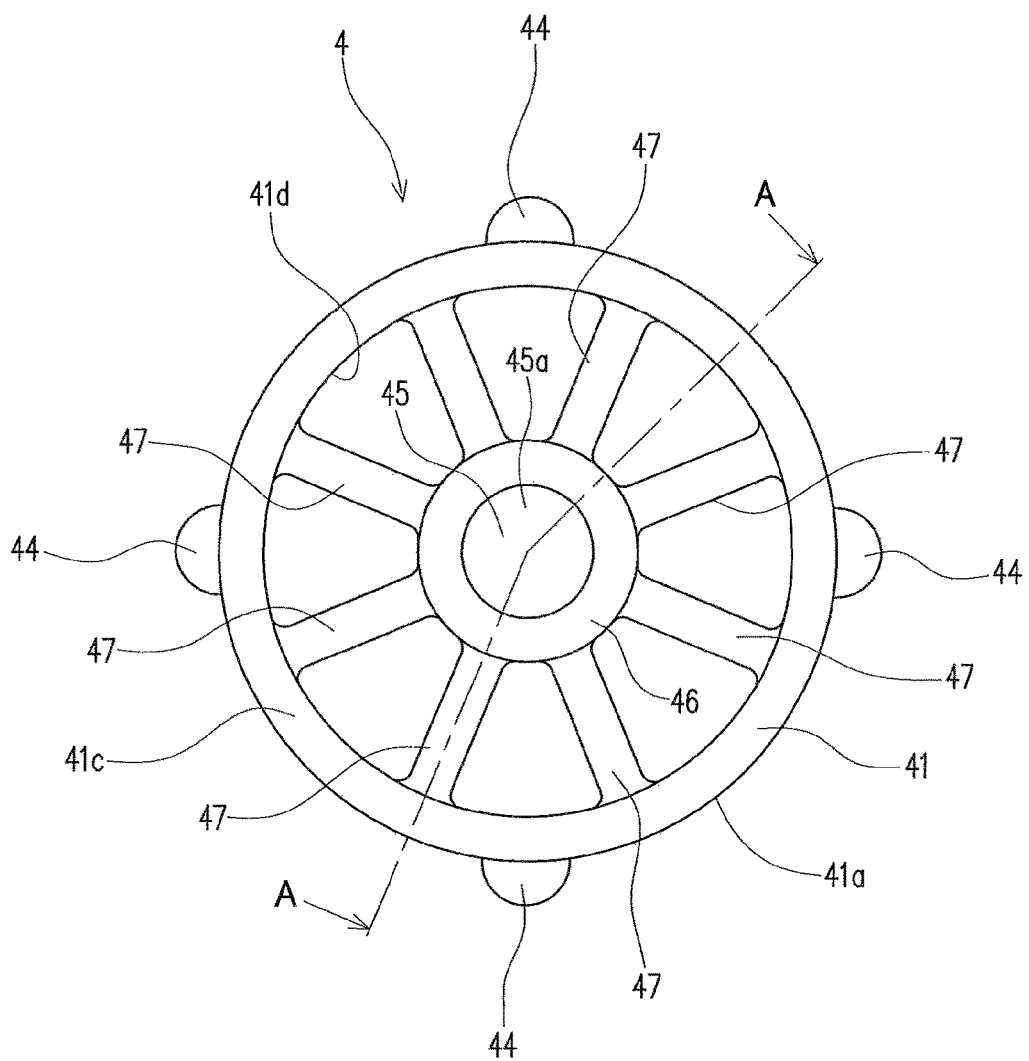
FIG. 6 is a view (rear view) thereof from the other side with reference to FIG. 5.
Figure 7:
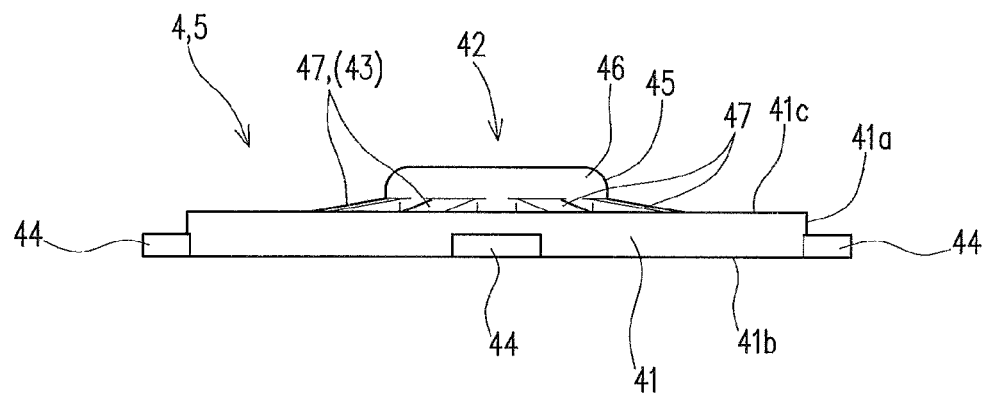
FIG. 7 is a plan view thereof with reference to FIG. 5.
Figure 8:
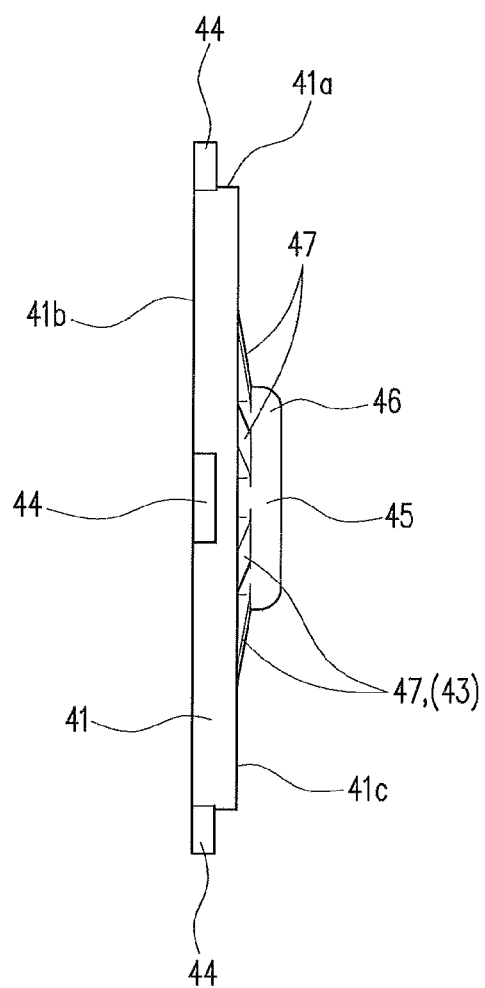
FIG. 8 is a right side view thereof with reference to FIG. 5.

Hereinafter, a check valve according to an embodiment of the present invention will be described with reference to the drawings. A first embodiment will be first described, with reference to FIG. 1 to FIG. 15. FIG. 7 is a plan view, and a bottom view is omitted since it is symmetric to the plan view. Further, FIG. 8 is a right side view, and a left side view is omitted since it is symmetric to the right side view. As shown in FIG. 1 and FIG. 2, a check valve 1 is formed by including a pair of members 2 and 3, an outflow side valve body 4, and an inflow side valve body 5. The pair of members 2 and 3 are components of a pump head 6 in a pump including the check valve 1 and are each formed into a rectangular plate shape. Therefore, in the following description, the pair of members 2 and 3 will be respectively referred to as a first plate member 2 and a second plate member 3.

Here, a valve body will be described. In the check valve 1 of this embodiment, an outflow side valve body 4 and an inflow side valve body 5 are used, and both of the valve bodies have the same configuration. Therefore, the description of the outflow side valve body 4 also describes the inflow side valve body 5.

As shown in FIG. 5 to FIG. 9, the outflow side valve body 4 integrally includes an outer frame 41, a sealing part 42 arranged inside the outer frame 41, and a coupling part 43 configured to couple the outer frame and the sealing part to each other. The outflow side valve body 4 is integrally formed, for example, using synthetic rubber.

Figure 9:
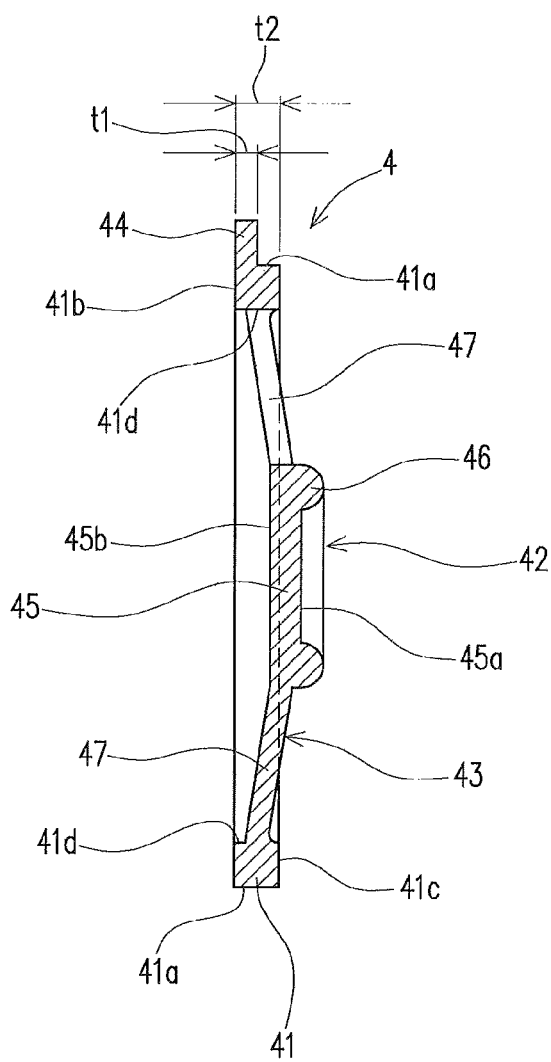
FIG. 9 is a sectional view thereof taken along the line A-A in FIG. 6.

The outer frame 41 is formed into an annular shape. As shown in FIG. 9, the radial cross section of the outer frame 41 is formed into a rectangular shape. Projections 44 that project radially outwardly are formed on an outer circumferential surface 41a of the outer frame 41. The projections 44 are arranged at intervals of 90° on the outer circumferential surface 41a. The projections 44 have a thickness t1 that is set to be smaller than a thickness t2 of the outer frame 41. The projections 44 are arranged to be flush with another surface 41b of the outer frame 41 on the outer circumferential surface 41a. Alternatively, the projections 44 may be arranged to be in an intermediate portion in the thickness direction of the outer frame 41. The diameter of an imaginary circle formed by connecting the tips of the projections 44 is set to be slightly smaller than the inner diameter of an outflow side annular groove 13A, which will be described below.

The sealing part 42 is configured to close a fluid path formed in the first plate member 2, as will be described below. The sealing part 42 integrally includes a disk-shaped body 45, and an abutting part 46 formed on the outer circumferential edge of one surface 45a in the thickness direction of the body 45. The abutting part 46 is formed into an annular shape projecting from the one surface 45a. The tip of the abutting part 46 is formed as an arcuate surface.

The sealing part 42 is arranged to be displaced from the outer frame 41 toward one side in the thickness direction thereof. In this embodiment, the amount of displacement of the sealing part 42 from the outer frame 41 is set to an extent such that an intermediate portion in the thickness direction of the body 45 coincides with one surface 41c of the outer frame 41. The one surface 45a of the body 45 is displaced from the one surface 41c of the outer frame 41 toward one side. The one surface 41c of the outer frame 41 is set to be parallel to the one surface 45a of the body 45.

The coupling part 43 is constituted by a plurality of connecting rods 47. The connecting rods 47 are formed into a plate shape and are radially arranged at equal intervals in the circumferential direction with the body 45 of the sealing part 42 at the center. Each of the connecting rods 47 is formed to have a smaller thickness than the outer frame 41 and the body 45 of the sealing part 42. The connecting rod 47 is formed to be inclined toward the side of the fluid path formed in the first plate member 2. The proximal end side of the connecting rod 47 is positioned close to the other surface 45b of the body 45. The distal end side of the connecting rod 47 is positioned in an intermediate portion in the thickness direction of an inner circumferential surface 41d of the outer frame 41.

The reason why the sealing part 42 is arranged to be displaced from the outer frame 41 toward the one side in the thickness direction is because the connecting rods 47 each are formed to be inclined toward the side of the fluid path formed in the first plate member 2.

Figure 11:
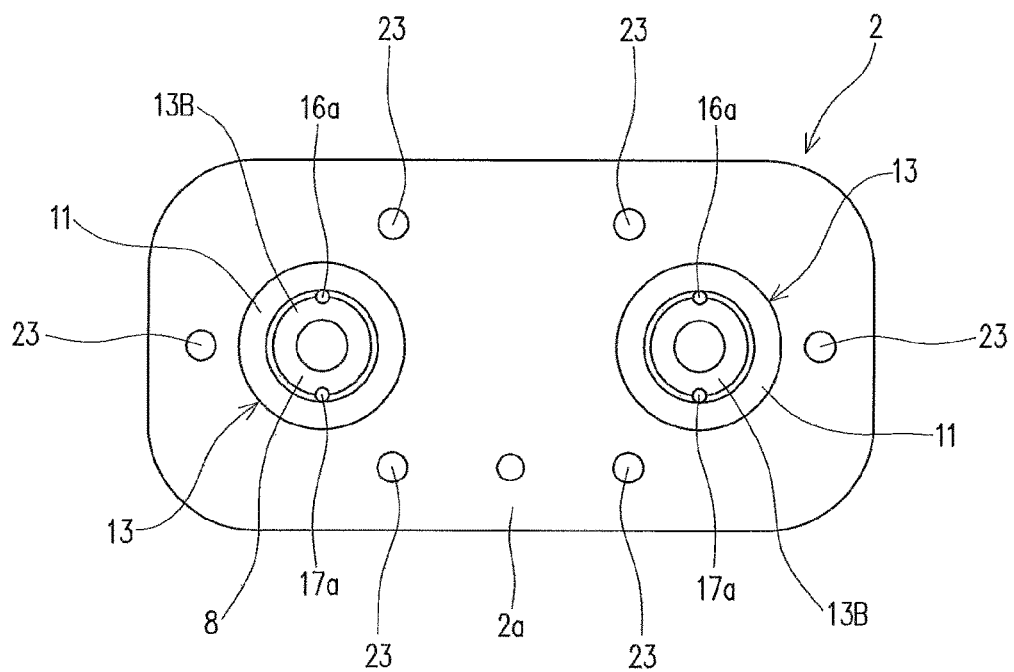
FIG. 11 is a front view of the first plate member thereof from one side.

As shown in FIG. 1, the first plate member 2 and the second plate member 3 are assembled so that their outer circumferential side surfaces are flush with each other, and a first opposed surface 2A and a second opposed surface 3A contact each other. As shown in FIG. 2 and FIG. 11, a recess 8 (pump chamber) in which a diaphragm 7 configured to reciprocate between one side and the other side by driving of a rod R is mounted is formed on one surface 2a in the thickness direction of the first plate member 2. A fluid circulation part 9 that is deeper than the outer circumferential portion is continuously formed at the center of the recess 8. The outer end of the diaphragm 7 is attached to the outer circumferential portion of the recess 8.

Figure 10:
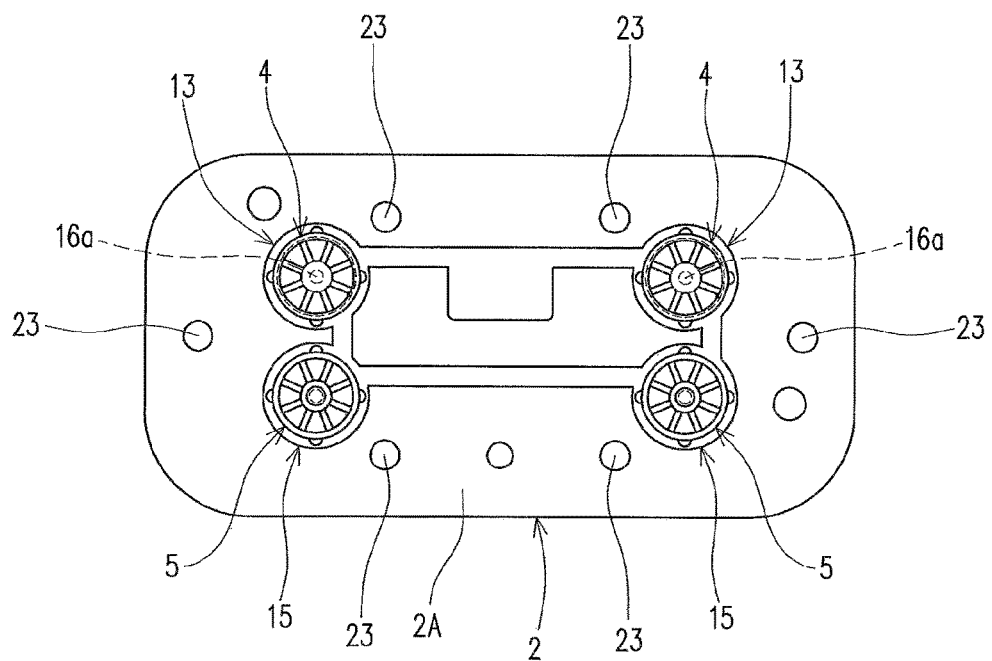
FIG. 10 is a view (front view) of the first plate member thereof from the other side in the state where the valve body is mounted.

As shown in FIG. 1, FIG. 2, and FIG. 10, in the first plate member 2, the other surface in the thickness direction is the first opposed surface 2A opposed to the second opposed surface 3A of the second plate member 3. A first outflow side clamping surface 11 configured to clamp the outer frame 41 of the outflow side valve body 4 by one side in the thickness direction is formed on the first opposed surface 2A in the portion where the outflow side valve body 4 is arranged. A first inflow side clamping surface 12 configured to clamp the outer frame 41 of the inflow side valve body 5 by one side in the thickness direction is formed on the first opposed surface 2A in the portion where the inflow side valve body 5 is arranged. The first outflow side clamping surface 11 and the first inflow side clamping surface 12 are parts of the first opposed surface 2A.

As shown in FIG. 2, the first outflow side clamping surface 11 is a recessed surface of the first opposed surface 2A and is part of the bottom surface of an outflow side mounting groove 13. Specifically, the outflow side mounting groove 13 includes the outflow side annular groove 13A having a large diameter, and an outflow side valve pocket 13B that is a disk-shaped space having a smaller diameter than the outflow side annular groove 13A. The outflow side valve pocket 13B is formed continuously at the position of the center portion of the outflow side annular groove 13A. The first outflow side clamping surface 11 is a surface stepped at the boundary between the outflow side valve pocket 13B and the outflow side annular groove 13A.

The diameter of the outflow side annular groove 13A is set to be slightly larger than the diameter of an imaginary circle connecting the tips of the projections 44 formed on the outer frame 41 of the outflow side valve body 4. Further, the first outflow side clamping surface 11 has a width in the radial direction summing the width in the radial direction of the projections 44 and the width in the radial direction of the outer frame 41. With this configuration, the projections 44 and the outer frame 41 can be placed (abutted) on the first outflow side clamping surface 11.

The first inflow side clamping surface 12 is a region in the outer circumferential portion on the bottom surface of a disk-shaped inflow side mounting groove 15 formed to have the same diameter as the outflow side annular groove 13A. The outflow side annular groove 13A and the inflow side mounting groove 15 are formed to have the same depth dl. In the first plate member 2, a first outflow path (which corresponds to the aforementioned fluid path) 16a configured to allow the outflow side valve pocket 13B and the recess 8 to communicate with each other is formed, and a first inflow path (which corresponds to the aforementioned fluid path) 17a configured to allow the inflow side mounting groove 15 and the recess 8 to communicate with each other is formed.

Figure 13:
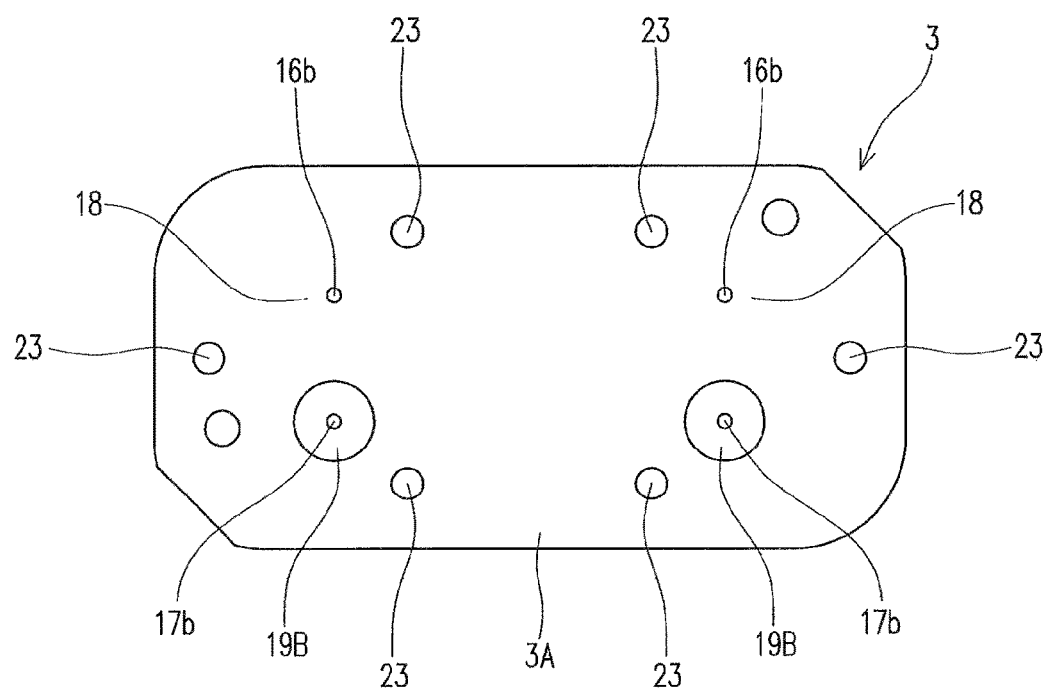
FIG. 13 is a front view of the second plate member thereof from one side.
Figure 14:
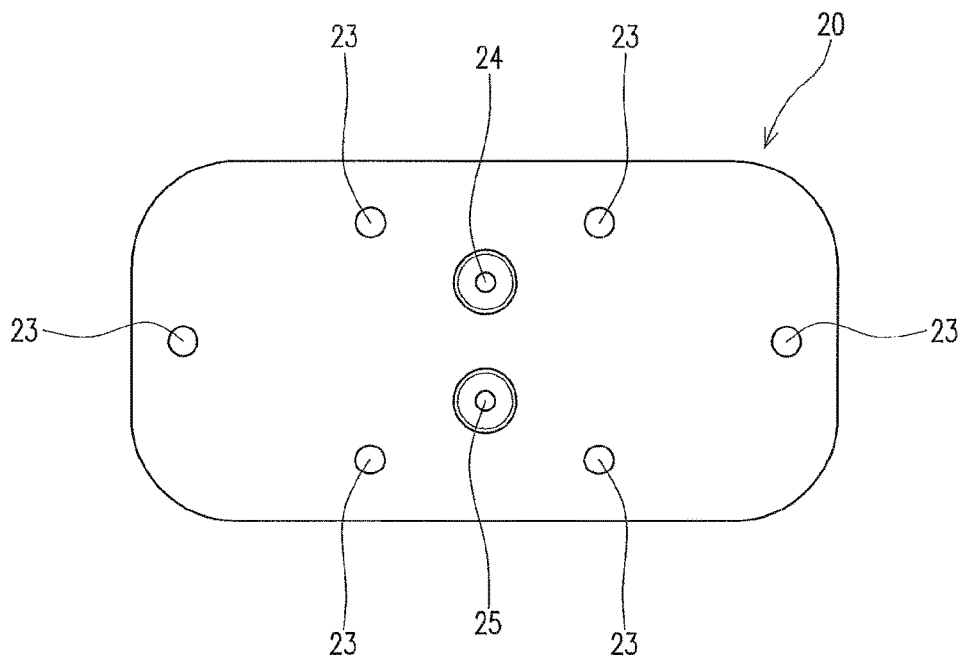
FIG. 14 is a front view of a third plate member thereof from the other side.
Figure 15:
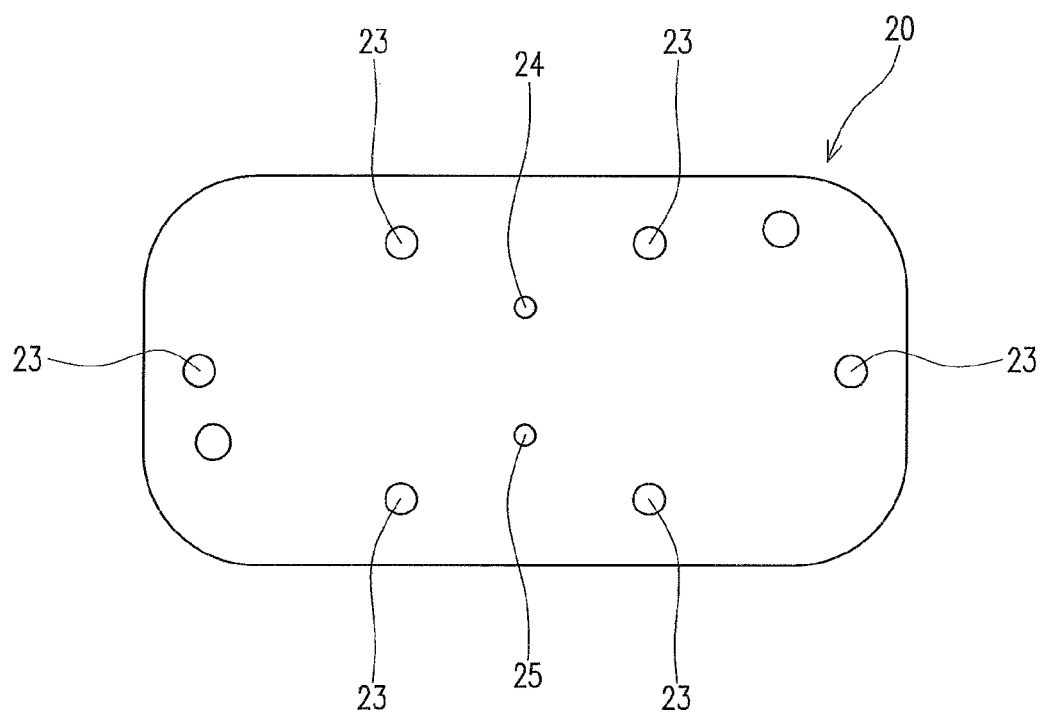
FIG. 15 is a front view of the third plate member thereof from one side.

As shown in FIG. 2 and FIG. 13, an outflow side second clamping surface 18 configured to clamp the outer frame 41 of the outflow side valve body 4 by the other side in the thickness direction is formed on the second opposed surface 3A of the second plate member 3 in the portion where the outflow side valve body 4 is arranged. As the outflow side second clamping surface 18, part of the second opposed surface 3A is used.

An inflow side valve pocket 19B is formed on the second opposed surface 3A of the second plate member 3 in the portion where the inflow side valve body 5 is arranged. The inflow side valve pocket 19B has the same shape as the outflow side valve pocket 13B but is formed to be recessed directly from the second opposed surface 3A, as being different from the outflow side valve pocket 13B. If the sealing part 42 of the inflow side valve body 5 is inserted into the inflow side valve pocket 19B, the projections 44 and the outer frame 41 of the inflow side valve body 5 protrude radially outwardly from the inflow side valve pocket 19B.

Figure 12:
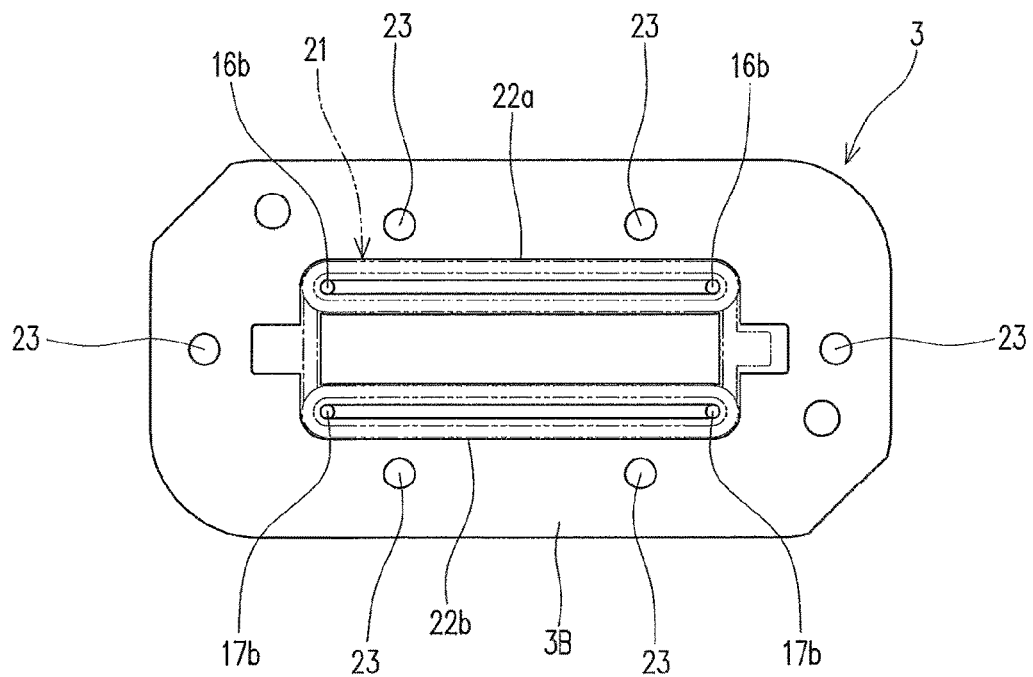
FIG. 12 is a front view of the second plate member thereof from the other side.

As shown in FIG. 2 and FIG. 12, seal mounting recesses 22a and 22b in which sealing members 21 are mounted when a third plate member 20 is assembled by abutting are formed on the other surface 3B in the thickness direction of the second plate member 3. In the second plate member 3, a second outflow path 16b configured to allow the outflow side mounting groove 13 and the seal mounting recess 22a to communicate with each other is formed, and a second inflow path 17b configured to allow the inflow side valve pocket 19B and the seal mounting recess 22b to communicate with each other is formed.

In order to assemble the first plate member 2 and the second plate member 3 so that their outer lateral surfaces are flush with each other, and the first opposed surface 2A and the second opposed surface 3A contact each other, the two members are fixed to each other by inserting assembling means such as wing screws, which are not shown, through assembling holes 23 formed on the plate surfaces of the first plate member 2 and the second plate member 3. Here, the third plate member 20, which will be described below, is also assembled together.

In the state where the first plate member 2 and the second plate member 3 are assembled so that their outer lateral surfaces are flush with each other, and the first opposed surface 2A and the second opposed surface 3A contact each other, the interplanar distance between the first outflow side clamping surface 11 and the second opposed surface 3A is set to be equal to the interplanar distance between the first inflow side clamping surface 12 and the second opposed surface 3A. When these interplanar distances are compared with the thickness t2 of the outer frame 41 of the outflow side valve body 4 (inflow side valve body 5), the thickness t2 of the outer frame 41 is set to be larger.

That is, in the outflow side valve body 4, when the outer frame 41 is mounted on the first outflow side clamping surface 11 (even if it is not pressed by the outflow side second clamping surface 18), the arcuate surface at the tip of the abutting part 46 of the sealing part 42 contacts the bottom surface of the outflow side valve pocket 13B so as to surround the opening of the first outflow path 16a. In the inflow side valve body 5, when the outer frame 41 is mounted on the first inflow side clamping surface 12, the sealing part 42 and the connecting rods 47 can be inserted into the inflow side valve pocket 19B, and the arcuate surface at the tip of the abutting part 46 of the sealing part 42 contacts the bottom surface of the inflow side valve pocket 19B so as to surround the opening of the second inflow path 17b before the second opposed surface 3A of the second plate member 3 is abutted against the first opposed surface 2A of the first plate member 2.

In other words, the outer frame 41 is compressed and elastically deformed in the thickness direction by being pressed from both sides in the thickness direction by the two clamping surfaces 11 and 18, or 12 and 18, and the elastic compressive deformation is transferred to the coupling part 43, so that the sealing part 42 is subjected to a directional force to be displaced toward the first outflow path 16a side or the second inflow path 17b side, that is, in the thickness direction by the amount corresponding to the elastic compressive deformation. The displacement of the sealing part 42 is guided by the connecting rods 47 formed in the outflow side valve body 4 (inflow side valve body 5) so as to be inclined toward the fluid path side in advance.

As described above, the outflow side valve body 4 and the inflow side valve body 5 have the same configuration but are arranged so that the use on the outflow side and the use on the inflow side are reversed in the thickness direction. Specifically, in the outflow side valve body 4, the sealing part 42 is arranged to be located on one side, whereas in the inflow side valve body 5, the sealing part 42 is arranged to be located on the other side.

As described above, the third plate member 20 shown in FIG. 2, FIG. 14 and FIG. 15 is assembled onto the other surface of the second plate member 3, and the third plate member 20 is assembled to the check valve 1 (second plate member 3) to serve as the pump head 6. In the third plate member 20, a third outflow path 24 and a third inflow path 25 communicating with with the seal mounting recesses 22a and 22b are formed.

In the outflow side valve body 4 and the inflow side valve body 5 of the check valve 1 with the aforementioned configuration, the outer frame 41 is compressed and elastically deformed in the thickness direction by being pressed from both sides in the thickness direction by the two clamping surfaces 11 and 18, or 12 and 18, and the elastic compressive deformation is transferred to the coupling part 43, so that the sealing part 42 is displaced toward the first outflow path 16a side or the second inflow path 17b side, that is, in the thickness direction by the amount corresponding to the elastic compressive deformation. Then, the outflow side valve body 4 and the inflow side valve body 5 are formed from elastic bodies. Therefore, the first outflow path 16a or the second inflow path 17b can be stably closed by the sealing part 42 (abutting part 46) without forming the sealing part 42 and the outer circumferential portion of the opening of the first outflow path 16a or the second inflow path 17b with especially high accuracy.

In this embodiment, for example, in the inflow side valve body 5, the connecting rods 47 are formed to be inclined toward the fluid path side in advance, and therefore the elastic compressive deformation due to the pressing of the outer frame 41 of the inflow side valve body 5 from both sides in the thickness direction by the two clamping surfaces 11 and 18, or 12 and 18 does not act as a force to move the sealing part 42 of the inflow side valve body 5 toward the inflow side mounting groove 15 side. Moreover, in the first plate member 2 and the second plate member 3, the inflow side valve pocket 19B is formed to be smaller than the inflow side mounting groove 15, thereby making it far easier to transfer the elastic compressive deformation to the sealing part 42, so that the sealing part 42 can be reliably pressed toward the second inflow path 17b side.

The outer frame 41 of the valve bodies 4 and 5 is formed into an annular shape, the coupling part 43 is constituted by the plurality of connecting rods 47, and the connecting rods 47 are radially arranged at equal intervals in the circumferential direction with the sealing part 42 at the center. Therefore, the amount of the elastic compressive deformation of the outer frame 41 in the thickness direction is uniform in the circumferential direction, and the amount of the elastic compressive deformation is uniformly distributed to the connecting rods 47, thereby allowing the sealing part 42 to be entirely displaced toward the one side in the thickness direction in a certain posture.

Further, the thickness of the coupling part 43 (connecting rods 47) is formed to be smaller than the thickness of the outer frame 41, and thereby the elastic compressive deformation of the outer frame 41 is easily transferred to the coupling part 43. Further, the thickness of the sealing part 42 is formed to be larger than the thickness of the coupling part 43, and therefore the rigidity of the sealing part 42 is higher than the rigidity of the coupling part 43, so that the behavior of the sealing part 42 can be stabilized. The thickness of the coupling part 43 is set so that the elastic compressive deformation of the outer frame 41 is easily transferred to the coupling part 43, and the posture of the sealing part 42 closing the fluid path can be reliably maintained, on the condition of being smaller than the thickness of the outer frame 41.

By the way, in a metering pump using the diaphragm 7, a phenomenon called overfeeding in which the outflow of fluid continues due to momentum of outflow of fluid (inertia of discharge of fluid) even when the driving of the pump is stopped occurs, and then fluid flows out excessively over a specified amount. Therefore, a back pressure valve, an anti-siphon check valve, or the like is generally provided separately from the valve body used as the check valve. However, in the outflow side valve body 4 of the check valve 1 of this embodiment, the outer frame 41 is compressed and elastically deformed in the thickness direction, and the elastic compressive deformation is transferred to the coupling part 43, so that the sealing part 42 is biased toward the first outflow path 16a that is the thickness direction. Therefore, at the same time when the driving of the pump is stopped, the sealing part 42 is reliably abutted against the outer circumferential portion of the opening of the first outflow path 16a by the biasing force due to the elastic compressive deformation. In this way, the sealing part 42 is abutted against the outer circumferential portion of the opening of the first outflow path 16a by the biasing force due to the elastic compressive deformation, and thereby the overfeeding can be prevented. Accordingly, the back pressure valve, the anti-siphon check valve, or the like can be omitted.

When fluid is supplied to the first outflow path 16a and the outflow side valve pocket 13B from the recess 8 with the reciprocal motion of the diaphragm 7 to one side and the other side by the driving of the rod R, the sealing part 42 (abutting part 46) of the outflow side valve body 4 moves away from the outer circumferential portion of the opening of the first outflow path 16a due to the fluid supply pressure, and the fluid moves toward the second outflow path 16b side, passing through the spaces between the connecting rods 47, to flow out (be discharged) through the third outflow path 24. Further, when fluid flows into the second inflow path 17b through the third inflow path 25 with the reciprocal motion of the diaphragm 7 to one side and the other side by the driving of the rod R, the sealing part 42 (abutting part 46) of the inflow side valve body 5 moves away from the outer circumferential portion of the opening of the second inflow path 17b due to the fluid supply pressure, and the fluid passes through the spaces between the connecting rods 47 to flow into the recess 8 from the first inflow path 17a.

In the first embodiment, the annular outer frame 41, one of the connecting rods 47, and the disk-shaped sealing part 42 are parts of the valve bodies 4 and 5 according to the present invention.

The check valve 1 of the present invention is not limited to the aforementioned embodiment, and various modifications can be made without departing from the gist of the present invention. In the first embodiment, a configuration in which the coupling part 43 in the valve bodies 4 and 5 is formed to be inclined toward the fluid path side, and thereby the sealing part 42 is arranged to be displaced in advance from the outer frame 41 toward one side in the thickness direction is shown as an example.

Figure 16:
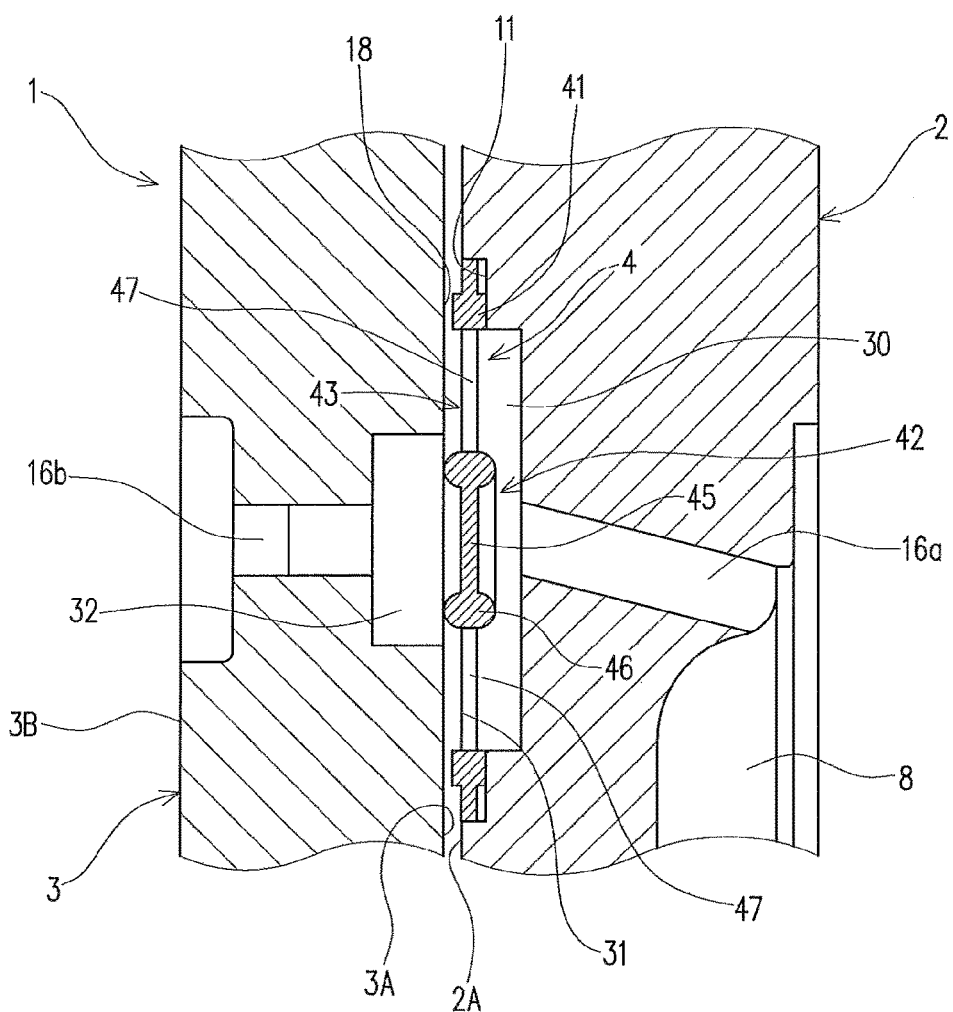
FIG. 16 is a sectional view of a check valve according to a second embodiment of the present invention before the outer frame of the valve body is compressed.

However, in a second embodiment, as shown in FIG. 16, it is also possible to form the outer frame 41, the sealing part 42, and the coupling part 43 to be flush with one another without inclining the coupling part 43 in the valve bodies 4 and 5. In this case, the abutting part 46 can be formed on the outer circumferential edges on both surfaces in the thickness direction of the body 45. When the abutting part 46 is formed on the outer circumferential edges on both surfaces in the thickness direction of the body 45, the need to select the directionality in the outflow side valve body 4 and the inflow side valve body 5 is eliminated.

In this case, in order to reliably displace the sealing part 42 in the thickness direction by the amount corresponding to the elastic compressive deformation of the outer frame 41 by being pressed from both sides in the thickness direction by the two clamping surfaces 11 and 18, or 12 and 18 (in the figure, only the clamping surfaces 11 and 18 are shown), an allowance recess 30 (which corresponds to the space communicating with the first outflow path 16a) that allows the displacement of the sealing part 42 and the coupling part 43 toward one fluid path side is formed, for example, on the first plate member 2 side in regions of the first plate member 2 and the second plate member 3 corresponding to the inner sides of the clamping surfaces 11 and 18. Further, a restricting part 31 configured to restrict the displacement of the sealing part 42 and the coupling part 43 toward the other fluid path side is provided on the second plate member 3 side. In the figure, part of the second opposed surface 3A located outside a recess 32 (which communicates with the second outflow path 16b) formed in part of the second opposed surface 3A so as to be opposed to the allowance recess 30 is used as the restricting part 31.

Figure 17:
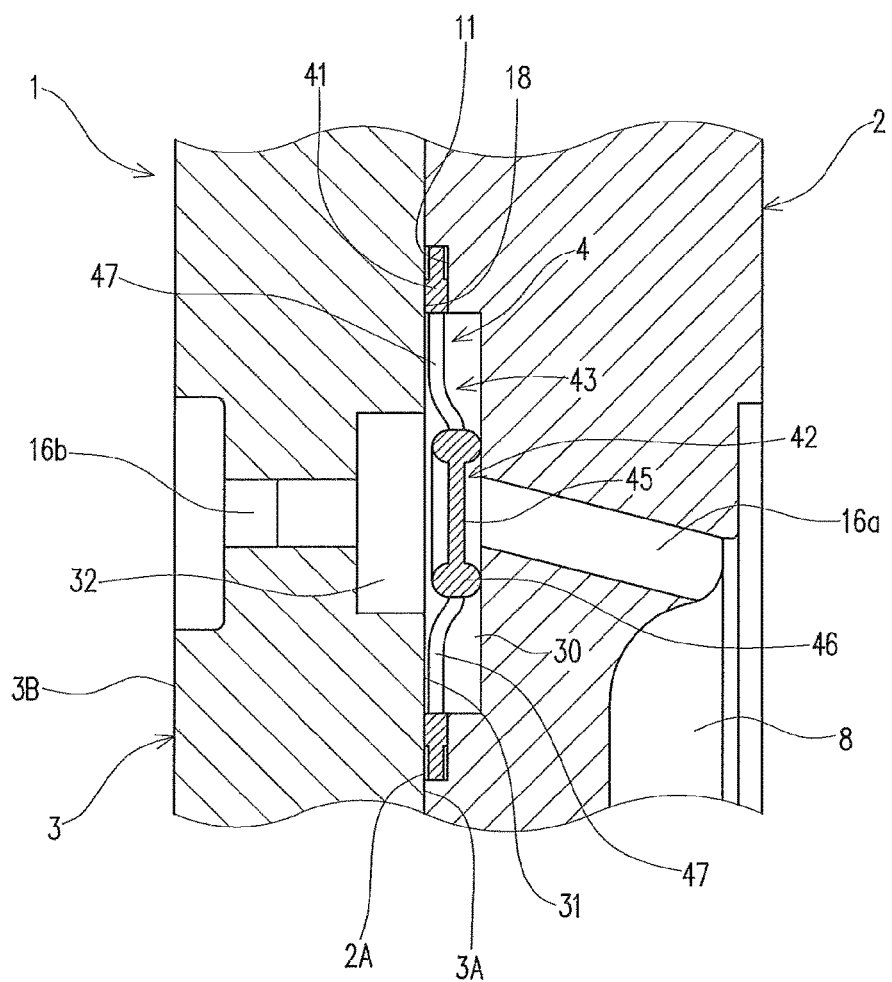
FIG. 17 is a sectional view thereof in the state where the outer frame of the valve body is compressed.

With such a configuration, the outer frame 41 of the valve bodies 4 and 5 is compressed and elastically deformed in the thickness direction by being pressed from both sides in the thickness direction by the two clamping surfaces 11 and 18, or 12 and 18, and the elastic compressive deformation is transferred to the coupling part 43, so that the sealing part 42 is displaced toward the fluid path side by the amount corresponding to the elastic compressive deformation, and the fluid path is stably closed by the sealing part 42, as shown in FIG. 17, even if the outer frame 41, the sealing part 42, and the coupling part 43 are formed to be flush with one another.

In the aforementioned embodiment, the case where the outer frame 41 of the valve bodies 4 and 5 is formed into an annular shape is shown as an example, but there is no limitation to this configuration. For example, the outer frame 41 can be formed into a rectangular frame shape, an elliptical frame shape, or the like. The sectional shape of the outer frame 41 of the valve bodies 4 and 5 is not limited to the rectangular shape and may be a circular or elliptical shape. In the aforementioned embodiment, the case where the connecting rods 47 are formed into a plate shape is shown as an example, but they may have a circular cross section. Other than above, the cross section may probably have a larger diameter or a triangular shape, in order to further facilitate the displacement of the sealing part 42 toward the one side in the thickness direction.

Figure 18A:
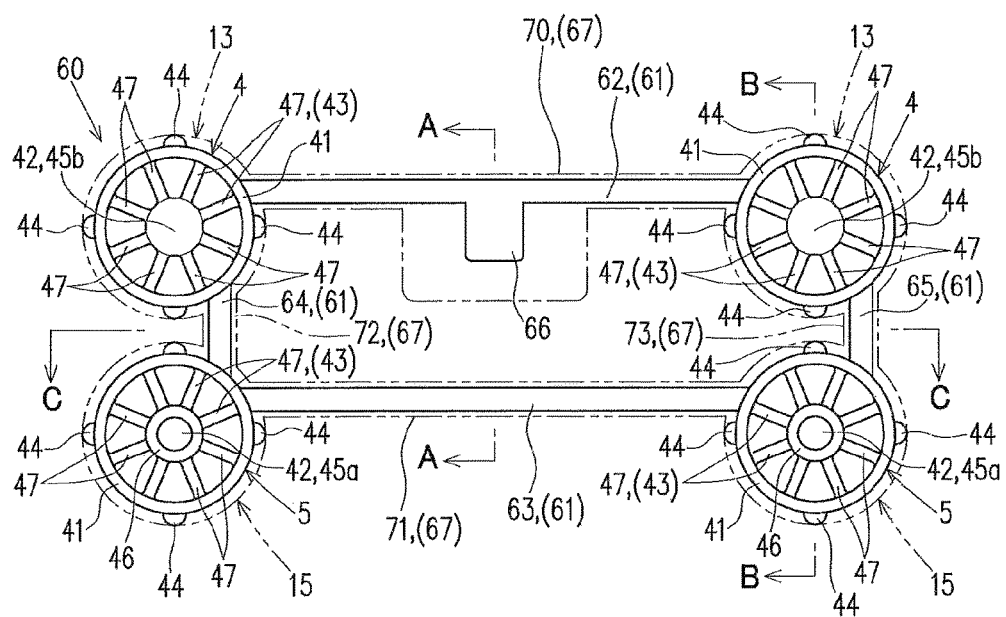
FIG. 18A is a front view showing valve bodies (valve body group) according to a third embodiment of the present invention.
Figure 18B:
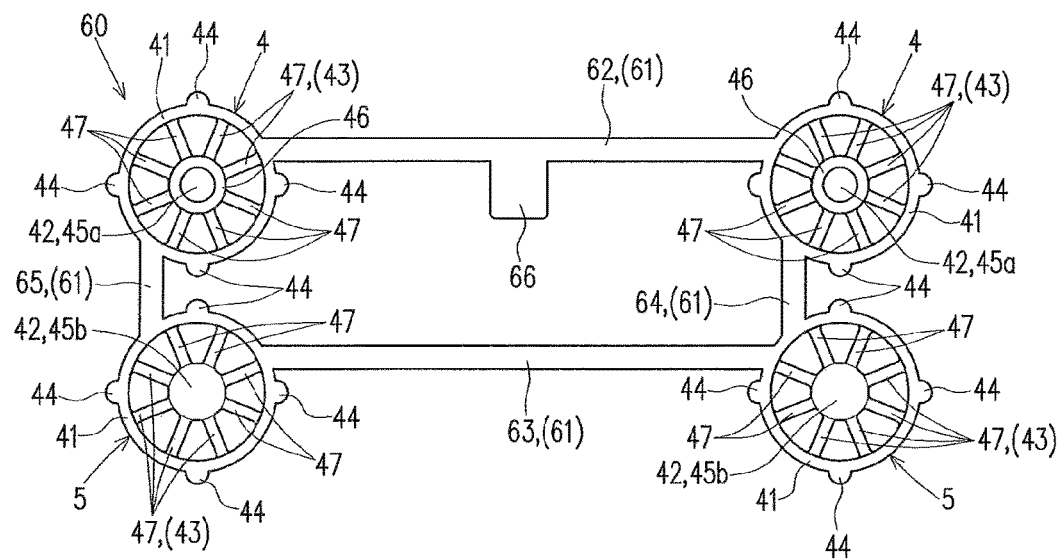
FIG. 18B is a rear view thereof.
Figure 19A:
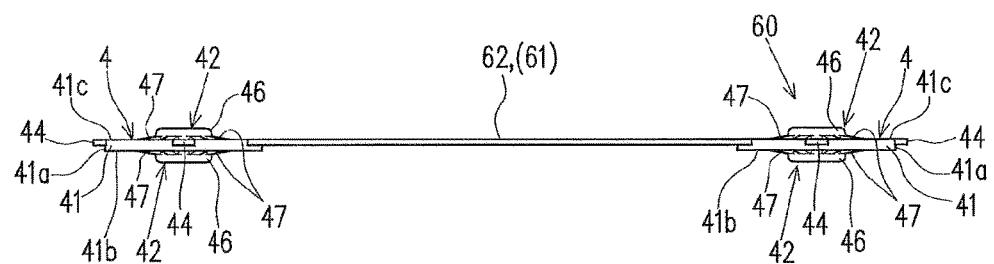
FIG. 19A is a plan view thereof.
Figure 19B:
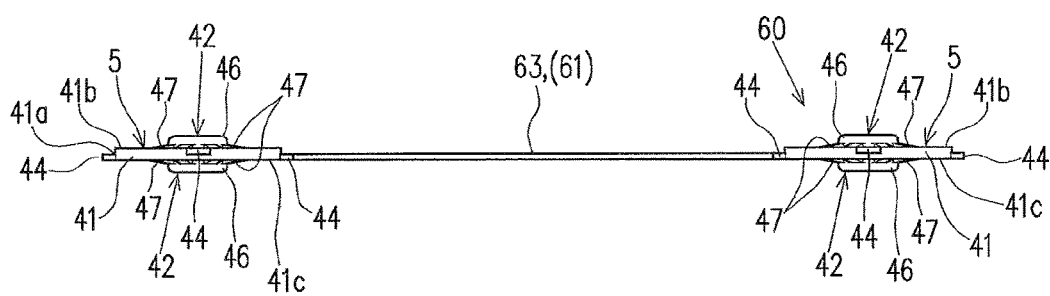
FIG. 19B is a bottom view thereof.
Figure 20A:
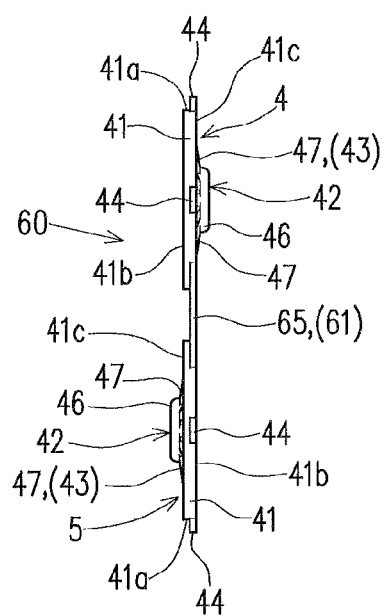
FIG. 20A is a right side view thereof.
Figure 20B:
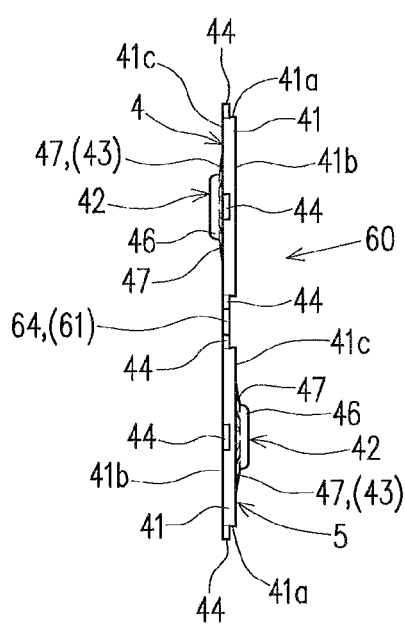
FIG. 20B is a left side view thereof.

FIG. 18 to FIG. 22 show a third embodiment. In the aforementioned embodiments, the case where the outflow side valve body 4 and the inflow side valve body 5 are individually handled is shown as an example. However, as shown in FIG. 18, the valve body of the third embodiment is configured so that two outflow side valve bodies 4 and two inflow side valve bodies 5 are integrally handled as a valve body group 60. The configuration and use of the outflow side valve bodies 4 and the inflow side valve bodies 5 are the same as in the first embodiment, and thus the descriptions thereof are not repeated. Members having the same functions are denoted by the same reference numerals as in the first embodiment. In FIG. 18, a positioning groove 67, which will be described below, the outflow side mounting groove 13, and the inflow side mounting groove 15 are shown by imaginary lines.

The valve body group 60 of the third embodiment includes the two outflow side valve bodies 4, the two inflow side valve bodies 5, and a connector 61. The projections 44 of the outflow side valve bodies 4 and the inflow side valve bodies 5 are oriented in the same direction. The connector 61 includes a first connecting part 62 configured to connect the outer frames 41 of the pair of outflow side valve bodies 4 arranged to be spaced apart in the width direction to each other, a second connecting part 63 configured to connect the outer frames 41 of the pair of inflow side valve bodies 5 arranged to be spaced apart in the width direction to each other, a third connecting part 64 configured to connect the outer frames 41 of the outflow side valve body 4 and the inflow side valve body 5 that are located on one side in the width direction and are arranged to be vertically spaced apart to each other, and a fourth connecting part 65 configured to connect the outer frames 41 of the outflow side valve body 4 and the inflow side valve body 5 that are located on the other side in the width direction and are arranged to be vertically spaced apart to each other.

In other words, the first connecting part 62 and the third connecting part 64 or the fourth connecting part 65 are connected to each of the outflow side valve bodies 4. Alternatively, the second connecting part 63 and the third connecting part 64 or the fourth connecting part 65 are connected to each of the inflow side valve bodies 5.

Figure 21A:
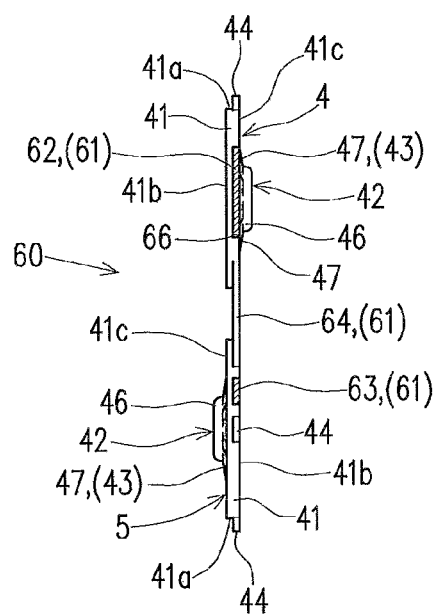
FIG. 21A is a sectional view thereof taken along the line A-A in FIG. 18A.
Figure 21B:
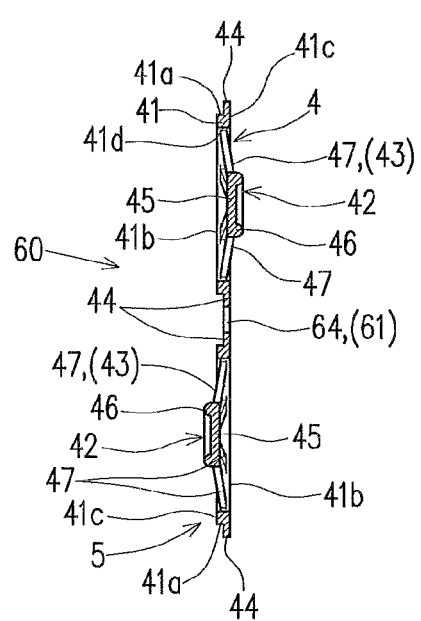
FIG. 21B is a sectional view thereof taken along the line B-B in FIG. 18A.
Figure 22:
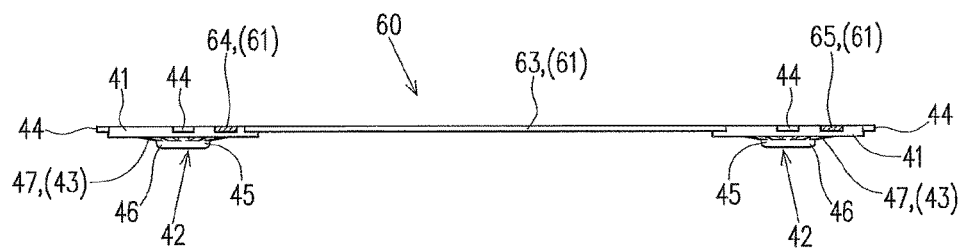
FIG. 22 is a sectional view thereof taken along the line C-C in FIG. 18A.
Figure 23A:
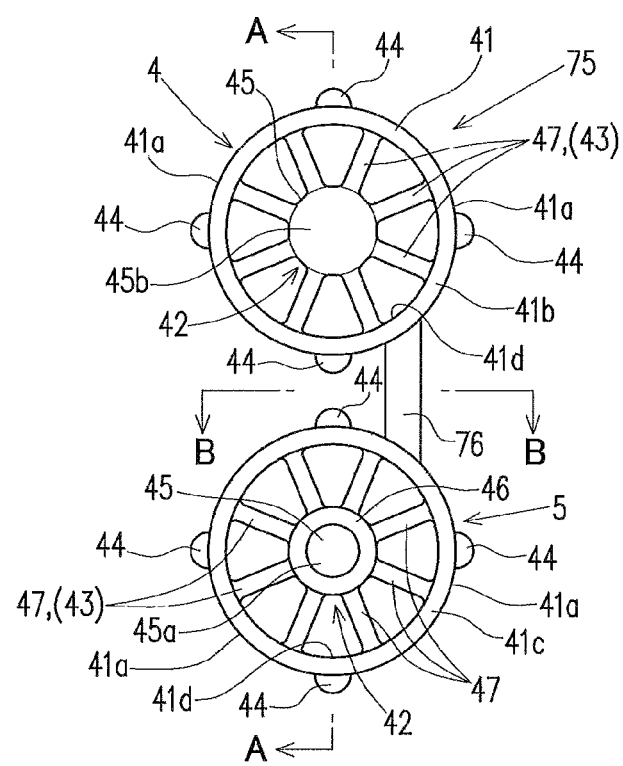
FIG. 23A is a front view showing valve bodies (valve body group) according to a fourth embodiment of the present invention.
Figure 23B:
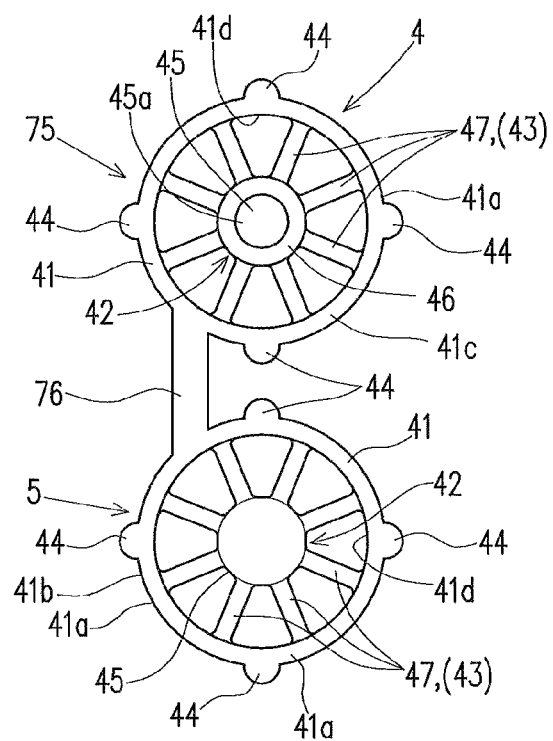
FIG. 23B is a rear view thereof.
Figure 24A:
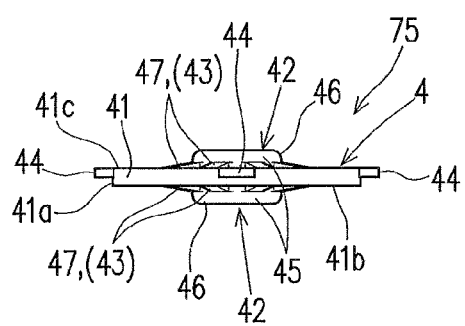
FIG. 24A is a plan view thereof.
Figure 24B:
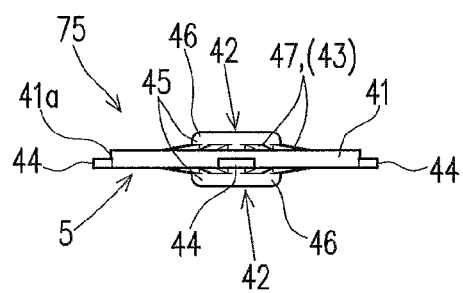
FIG. 24B is a bottom view thereof.
Figure 25A:
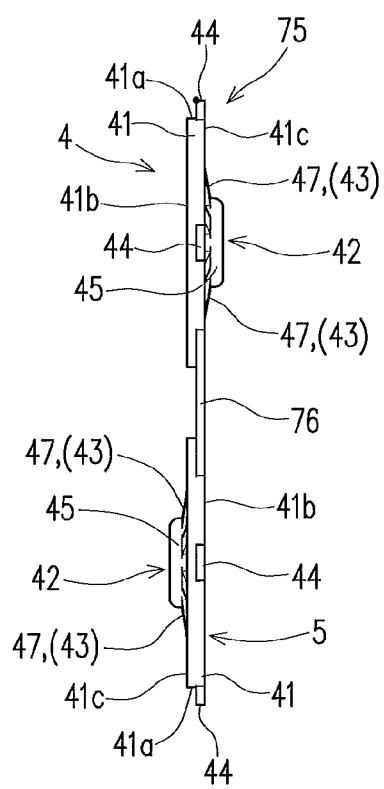
FIG. 25A is a right side view thereof.
Figure 25B:
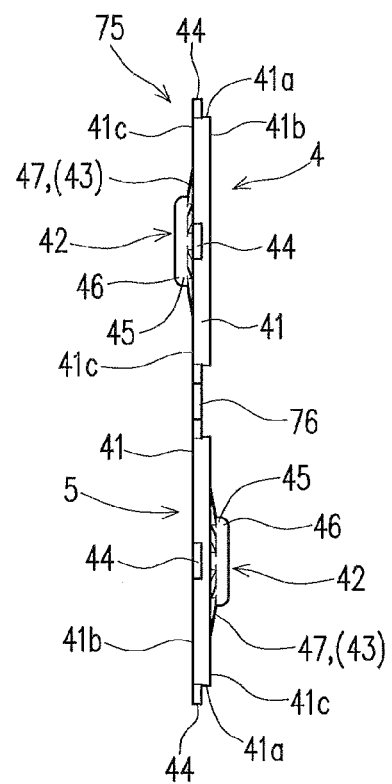
FIG. 25B is a left side view thereof.
Figure 26A:
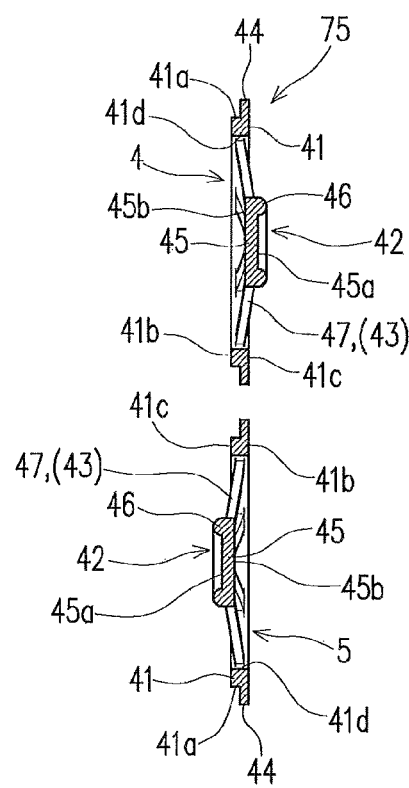
FIG. 26A is a sectional view thereof taken along the line A-A in FIG. 23A.
Figure 26B:
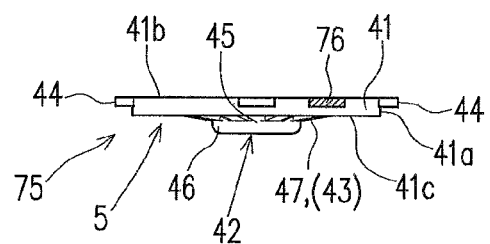
FIG. 26B is a sectional view thereof taken along the line B-B in FIG. 23A.
Figure 28:
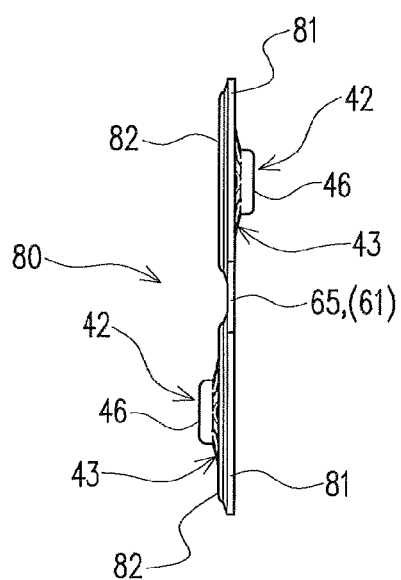
FIG. 28 is a right side view thereof.
Figure 29:
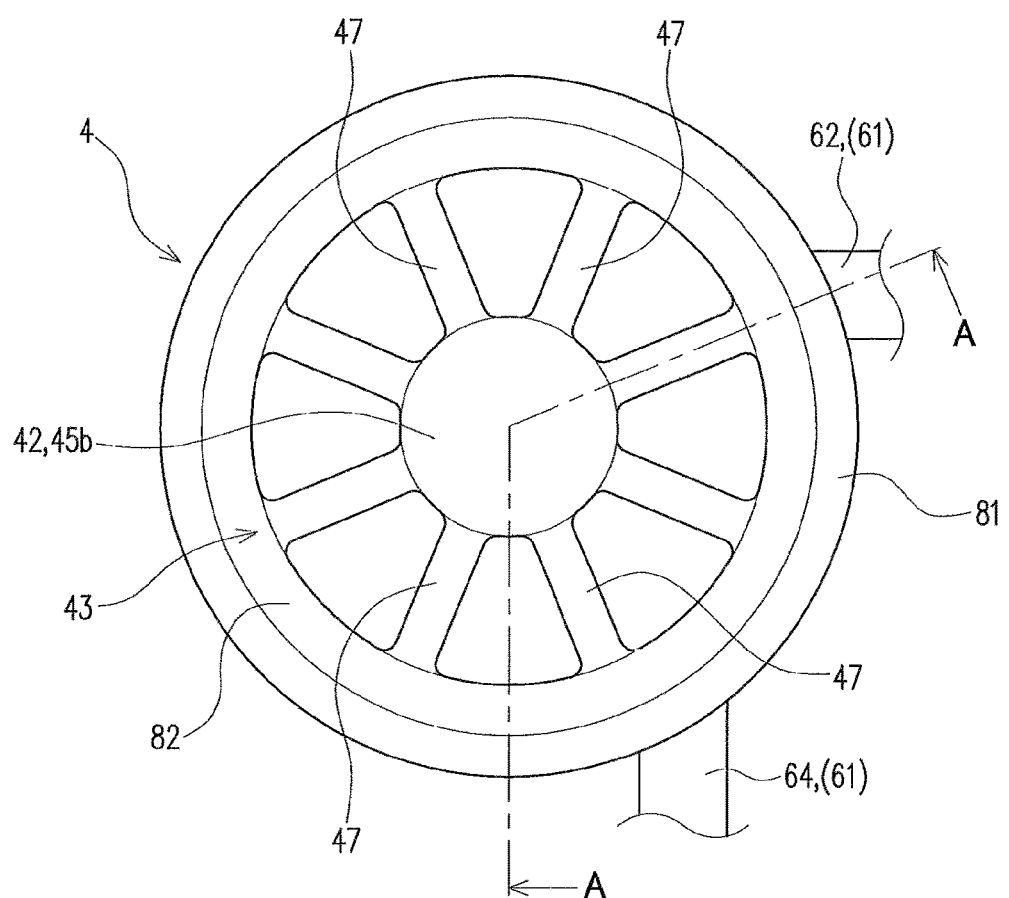
FIG. 29 is a partially enlarged front view of an outflow valve body thereof.
Figure 30:
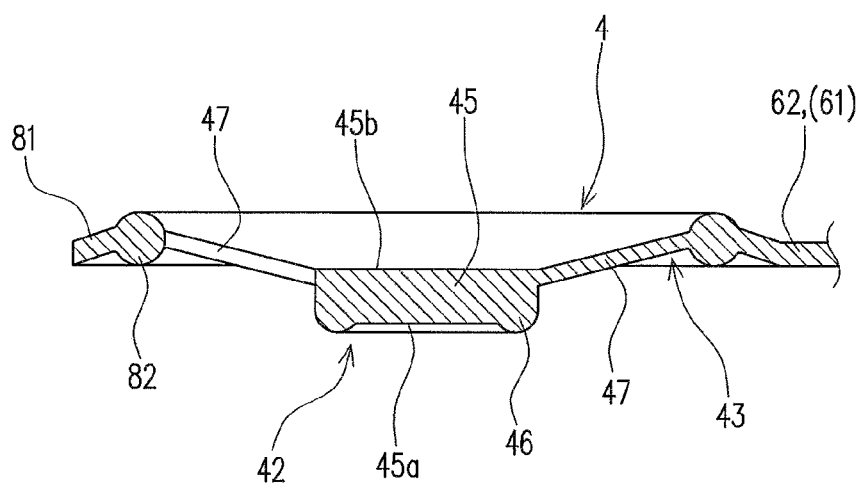
FIG. 30 is a sectional view thereof taken along the line A-A in FIG. 29.
Figure 31:
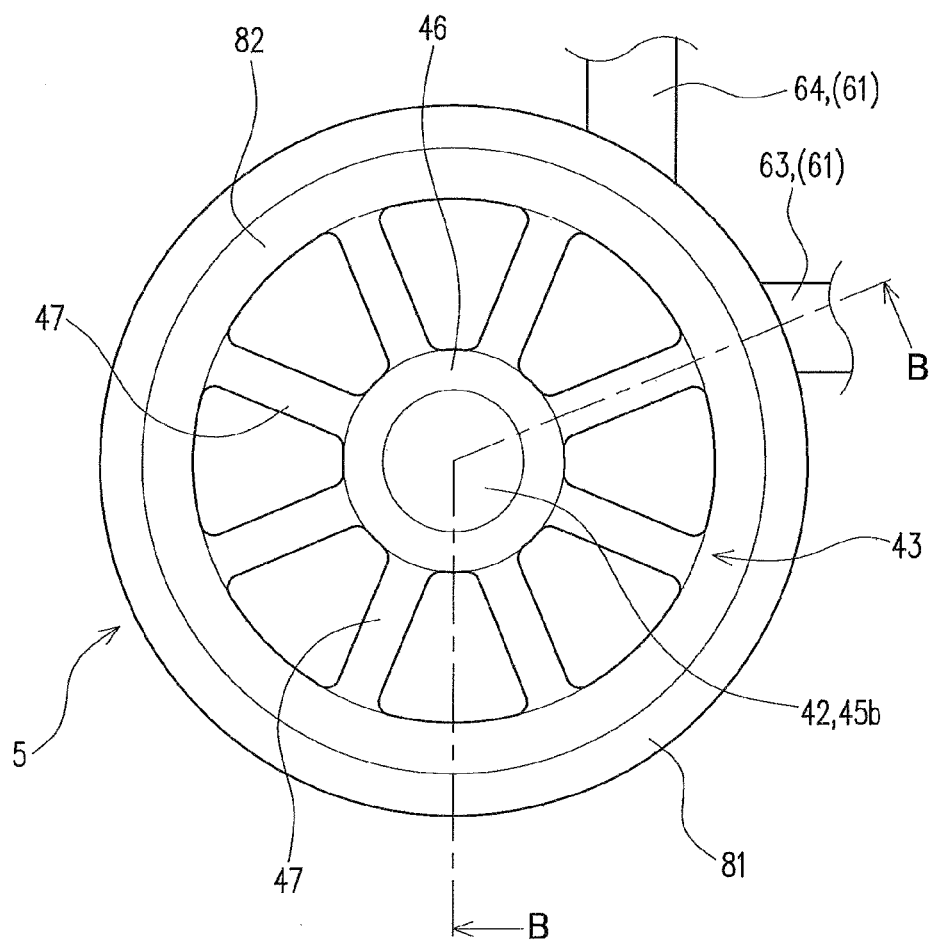
FIG. 31 is a partially enlarged front view of an inflow valve body thereof.
Figure 32:
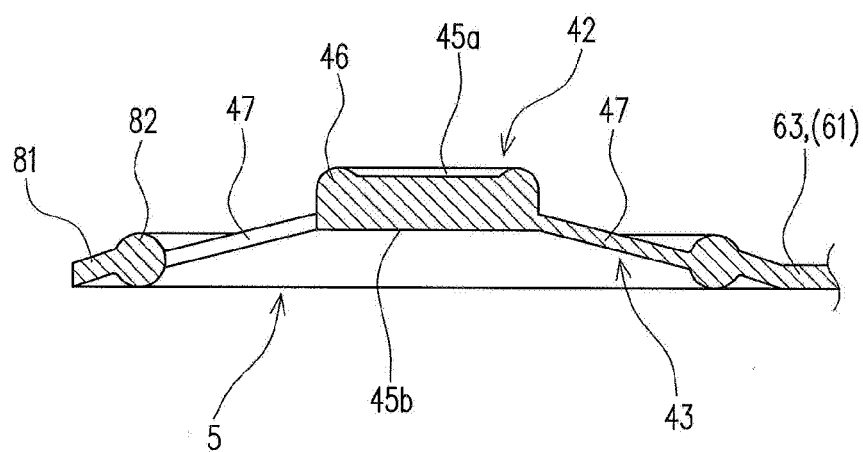
FIG. 32 is a sectional view thereof taken along the line B-B in FIG. 31.

Each of the first connecting part 62, the second connecting part 63, the third connecting part 64, and the fourth connecting part 65 is formed into a rod shape and is formed to have the same sectional shape of the middle part in the longitudinal direction. That is, as shown in FIG. 21, the sectional shape is formed to be a flat rectangular shape. The first connecting part 62, the second connecting part 63, the third connecting part 64, and the fourth connecting part 65 have the same thickness, which is set to be equal to the thickness t1 of the projections 44. In the outflow side valve bodies 4, the projections 44 are arranged to be flush with the end face of the outer frame 41 on the sealing part 42 side, and in the inflow side valve bodies 5, the projections are arranged to be flush with the end face of the outer frame 41 on the opposite side to the sealing part 42.

In the first connecting part 62, a gripping piece 66 used for gripping the valve body group 60 when it is handled as a whole is integrally formed. The gripping piece 66 is arranged at the center in the longitudinal direction of the first connecting part 62. The gripping piece 66 is intended to facilitate the handling of the valve body group 60 as a whole and can be omitted.

In the third embodiment, on the first opposed surface 2A of the first plate member 2, outflow side mounting grooves 13 and inflow side mounting grooves 15 are formed, as in the first embodiment, and a positioning groove 67 in which the first connecting part 62, the second connecting part 63, the third connecting part 64, and the fourth connecting part 65 are mounted is formed.

The positioning groove 67 includes a first groove part 70 in which the first connecting part 62 is mounted, a second groove part 71 in which the second connecting part 63 is mounted, a third groove part 72 in which the third connecting part 64 is mounted, and a fourth groove part 73 in which the fourth connecting part 65 is mounted. The first groove part 70 is formed to allow the outflow side mounting grooves 13 to communicate with each other. The second groove part 71 is formed to allow the inflow side mounting grooves 15 to communicate with each other. Each of the third groove part 72 and the fourth groove part 73 are formed to allow the outflow side mounting grooves 13 to communicate with the inflow side mounting grooves 15. The bottom surfaces of the first groove part 70, the second groove part 71, the third groove part 72, and the fourth groove part 73 are flush with the first outflow side clamping surface 11 (first inflow side clamping surface 12).

The first connecting part 62 is arranged at a position displaced from the centers in the radial direction of the outer frames 41 of the outflow side valve bodies 4 toward one side (in this case, upward). The second connecting part 63 is arranged at a position displaced from the centers in the radial direction of the outer frames 41 of the inflow side valve bodies 5 toward one side (in this case, upward). The third connecting part 64 and the fourth connecting part 65 are arranged at positions displaced respectively from the centers in the radial direction of the outflow side valve bodies 4 and the inflow side valve bodies 5 toward one side (in this case, laterally). The first connecting part 62 and the second connecting part 63 are formed to be parallel to each other. The third connecting part 64 and the fourth connecting part 65 are formed to be parallel to each other.

In the valve body group 60 of the third embodiment, the first connecting part 62 is mounted in the first groove part 70, the second connecting part 63 is mounted in the second groove part 71, the third connecting part 64 is mounted in the third groove part 72, and the fourth connecting part 65 is mounted in the fourth groove part 73. Further, the outflow side valve bodies 4 are mounted in the outflow side mounting grooves 13, and the inflow side valve bodies 5 are mounted in the inflow side mounting grooves 15, as in the first embodiment. Thereafter, the outer frames 41 of the outflow side valve bodies 4 and the inflow side valve bodies 5 are elastically compressed so that the second opposed surfaces 3A of the second plate members 3 abut the first opposed surfaces 2A of the first plate members 2. The action of each of the outflow side valve bodies 4 and the inflow side valve bodies 5 is the same as in the first embodiment.

According to the valve body group 60 of the third embodiment, the four valve bodies 4 and 5 are integrally configured via the first connecting part 62, the second connecting part 63, the third connecting part 64, and the fourth connecting part 65, and therefore there is no need to handle the valve bodies 4 and 5 one by one. Accordingly, the product management is easy, and mounting can be performed without errors in the vertical relationship and the front and back positions (mounting direction) in the thickness direction of the outflow side valve bodies 4 and the inflow side valve bodies 5. The connecting parts 62, 63, 64, and 65 are intended to integrally handle the four valve bodies 4 and 5, and the parts having the valve function are the valve bodies 4 and 5.

In the valve body group 60 of the third embodiment, the outflow side valve bodies 4 or the inflow side valve bodies 5 are parts of the valve body group 60 according to the present invention.

FIG. 23 to FIG. 26 show a fourth embodiment. A valve body group 75 in the fourth embodiment includes a single outflow side valve body 4, a single inflow side valve body 5, and a single connecting part 76 configured to connect the valve bodies 4 and 5 to each other. In other words, the single outflow side valve body 4 and the single inflow side valve body 5 are vertically arranged while sharing the single connecting part 76. Each of the valve bodies 4 and 5 has the same configuration as in the first embodiment and is therefore denoted by the same reference numeral, and the description thereof is not repeated. The connecting part 76 has the same configuration as the third connecting part 64.

According to the valve body group 75 in the fourth embodiment, the two valve bodies 4 and 5 are integrally configured via the connecting part 76, and therefore there is no need to handle the valve bodies 4 and 5 one by one. Accordingly, the product management is easy, and mounting can be performed without errors in the vertical relationship and the front and back positions (mounting direction) in the thickness direction of the outflow side valve body 4 and the inflow side valve body 5. The connecting part 76 is intended to integrally handle the two valve bodies 4 and 5, and the parts having the valve function are the valve bodies 4 and 5.

In the valve body group 75 of the fourth embodiment, the outflow side valve body 4 or the inflow side valve body 5 are parts of the valve body group 75 according to the present invention.

In the aforementioned embodiment, the outflow side valve body 4 integrally includes the outer frame 41, the sealing part 42 arranged inside the outer frame 41, and the coupling part 43 configured to couple the outer frame and the sealing part to each other. The case where the coupling part 43 has the plurality of connecting rods 47 radially arranged at equal intervals in the circumferential direction with the body 45 of the sealing part 42 at the center is shown as an example. That is, the outer frame 41 and the sealing part 42 can be integrated even by the single connecting rod 47.

Further, the coupling part 43 is not only constituted by a rod-shaped member but also can be changed so as to be constituted, for example, by a plurality of coupling plates (in a fan shape in front view) having a larger width than the connecting rod 47 and arranged at equal intervals in the circumferential direction.

In the aforementioned embodiments, the case where the projections 44 that project radially outwardly are formed on the outer circumferential surface 41a of the outer frame 41 is shown as an example. However, the projections 44 are not necessarily provided.

FIG. 27 to FIG. 32 show a fifth embodiment. The configuration of a valve body group 80 in the fifth embodiment is different from the configuration of the valve body group 60 in the third embodiment in that each of the outflow valve bodies 4 and the inflow valve bodies 5 includes a projection frame 81 instead of the projections 44, and the sectional shape of an outer frame 82 of the outflow valve bodies 4 and the inflow valve bodies 5 is different. The configuration and shape thereof other than the aforementioned different configuration and shape are the same manner as in the third embodiment. However, the gripping piece 66 is arranged to be displaced from the center in the longitudinal direction of the first connecting part 62 toward one outflow valve body 4 side.

Each of the outflow valve bodies 4 and the inflow valve bodies 5 in the fifth embodiment has the annular projection frame 81 formed integrally with the outer frame 82 on the outer circumferential surface of the outer frame 41 instead of the projections 44. In the outflow valve body 4, the radially outer side of the projection frame 81 is inclined to be located more on one side in the thickness direction (see FIG. 30). In the inflow valve body 5, the radially outer side of the projection frame 81 is inclined to be located more on the opposite side to the thickness direction in which the sealing part 42 is displaced from the outer frame 82 (see FIG. 32).

The projection frame 81 is formed into a plate shape, and the thickness thereof is formed to be larger than the thickness of the connecting rods 47. The distance from the center in the radial direction of each of the valve bodies 4 and 5 to the radially outer end of the projection frame 81, that is, the radius of the valve bodies 4 and 5 is set to be equal to the distance from the center in the radial direction of each of the valve bodies 4 and 5 to the radially outer end of the projections 44 in the third embodiment.

In the valve bodies 4 and 5 in the third embodiment, the radial cross section of the outer frame 41 is formed into a rectangular shape, whereas the radial cross section of the outer frame 82 in the fifth embodiment is formed into a substantially circular shape. The diameter of the outer frame 82 is formed to be larger than the thickness of the projection frame 81. The projection frame 81 is formed to be inclined from the center in the radial direction of the outer circumferential surface of the outer frame 82.

With no external force acting on the valve bodies 4 and 5, the corner edge on one side in the thickness direction of the projection frame 81 and the end on one side in the thickness direction on the outer circumferential surface of the outer frame 82 are set to be located at the same position (so as to be present on the same plane) in the thickness direction of the valve bodies 4 and 5.

The configuration of the valve bodies 4 and 5 in the fifth embodiment that is different from the configuration of the valve bodies 4 and 5 in the third embodiment is described as above. Other parts of the valve bodies 4 and 5 in the fifth embodiment have the same configuration and the same shape as the valve bodies 4 and 5 in the third embodiment and thus are denoted by the same reference numerals. The descriptions thereof are not repeated.

The valve bodies 4 and 5 in the fifth embodiment are incorporated as elements of parts constituting the valve body group 80. However, the valve bodies 4 and 5 in the fifth embodiment can be used individually without being coupled by the first connecting part 62, the second connecting part 63, the third connecting part 64, and the fourth connecting part 65 shown in the third embodiment.

Further, the valve bodies 4 and 5 in the fifth embodiment can be used also as a valve body group including a single outflow side valve body 4, a single inflow side valve body 5, and a single connecting part 76 configured to connect the valve bodies 4 and 5 to each other, as in the fourth embodiment shown in FIG. 23 to FIG. 26. Also in this case, the parts different from the fourth embodiment are only the configuration and shape of the projection frame 81 and the outer frame 82, and the configuration and shape of other parts are the same as in the fourth embodiment.

As shown in FIG. 17, the valve bodies 4 and 5 in the fifth embodiment are used while being compressed in the thickness direction. In this case, the outer frame 82 having a substantially circular cross section is clamped by the first outflow side clamping surface 11 and the outflow side second clamping surface 18 to be compressed and elastically deformed in the thickness direction, and thereby the sealing part 42 is displaced in the thickness direction of the valve bodies 4 and 5. The valve bodies 4 and 5 of the fifth embodiment can exert the same operational effects as in the aforementioned embodiments by the elastic compressive deformation.

REFERENCE SIGNS LIST

1: Check valve
2: First plate member
2A: First opposed surface
2a: One surface in thickness direction
3: Second plate member
3A: Second opposed surface
3B: The other surface in the thickness direction
4: Outflow side valve body
5: Inflow side valve body
6: Pump head
7: Diaphragm
8: Recess
11: First outflow side clamping surface
12: First inflow side clamping surface
13: Outflow side mounting groove
13A: Outflow side annular groove
13B: Outflow side valve pocket
15: Inflow side mounting groove
18: Outflow side second clamping surface
19B: Inflow side valve pocket
21: Sealing member
22: Seal mounting recess
30: Allowance recess
31: Restricting part
32: Recess
41: Outer frame
41a: Outer circumferential surface
41b: The other surface
41c: One surface
41d: Inner circumferential surface
42: Sealing part
43: Coupling part
44: Projection
45: Body
46: Abutting part
47: Connecting rod

The invention claimed is:

1. A check valve comprising:
a pair of members comprising clamping surfaces; and
a valve body group provided with a plurality of valve bodies clamped by the clamping surfaces from both sides in a thickness direction of the valve body, wherein
each of the valve bodies comprises an outer frame, a sealing part arranged inside the outer frame and configured to open and close a fluid path formed in one of the pair of members, and a coupling part configured to allow fluid to pass therethrough in the thickness direction and configured to couple the outer frame and the sealing part to each other,
the coupling part is constituted by a plurality of connecting rods that are radially arranged at equal intervals in a circumferential direction with the sealing part at a center, each of the plurality of connecting rods being inclined toward a side of the fluid path,
the outer frame, the sealing part, and the coupling part are formed from elastic bodies,
the outer frame has a thickness set to be larger than an interplane dimension between the clamping surfaces when the pair of members are joined together,
when the pair of members are joined together, the plurality of connecting rods are curved and the sealing part is displaced toward one side in the thickness direction by elastic compressive deformation in the thickness direction of the outer frame clamped by the clamping surfaces of the pair of members,
the plurality of valve bodies comprise an outflow side valve body that allows the fluid to pass in one direction of the thickness direction, and an inflow side valve body that allows the fluid to pass in another direction of the thickness direction, and
the outflow side valve body and the inflow side valve body are connected to each other with a connecting part having a rod shape.

2. The check valve according to claim 1, wherein the coupling part is formed to have a smaller thickness than the outer frame.

3. The check valve according to claim 2, wherein the sealing part is formed to have a larger thickness than the coupling part.

4. The check valve according to claim 1, wherein
the one of the pair of members comprises a space with which the fluid path communicates and which allows the sealing part to be displaced toward the one side in the thickness direction by the elastic compressive deformation of the outer frame in the thickness direction, and
the other of the pair of members comprises a restricting part configured to restrict displacement of the sealing part toward another side in the thickness direction.

5. The check valve according to claim 4, wherein the coupling part is formed to have a smaller thickness than the outer frame.

6. The check valve according to claim 5, wherein the sealing part is formed to have a larger thickness than the coupling part.

7. A valve body group provided with a plurality of valve bodies, each of the plurality of valve bodies comprising:
an outer frame;
a sealing part arranged inside the outer frame and configured to open and close a fluid path; and
a coupling part configured to allow fluid to pass therethrough and configured to couple the outer frame and the sealing part to each other,
wherein:
the coupling part is constituted by a plurality of connecting rods that are radially arranged at equal intervals in a circumferential direction with the sealing part at a center, each of the plurality of connecting rods being inclined to be displaced from the outer frame toward one side in a thickness direction thereof, the outer frame, the sealing part, and the coupling part are formed from elastic bodies, the outer frame has a thickness set to be larger than a dimension between opposed surfaces at mounting positions in a pair of members which are arranged to be opposed to each other and to which the valve body is mounted, the plurality of valve bodies comprise an outflow side valve body that allows the fluid to pass in one direction of the thickness direction, and an inflow side valve body that allows the fluid to pass in another direction of the thickness direction, and the outflow side valve body and the inflow side valve body share a connecting part having a rod shape.

8. The valve body group according to claim 7, wherein in each of the plurality of valve bodies, the coupling part is formed so that the sealing part is located more on one side in a thickness direction than the outer frame.

9. The valve body group according to claim 7, wherein:
in each of the plurality of valve bodies, the outer frame is formed into an annular shape, and
the coupling part is constituted by a plurality of connecting rods independent of one another.

10. The valve body group according to claim 7, wherein in each of the plurality of valve bodies, a plurality of projections projecting radially outward, or an annular projection frame is formed on an outer circumferential surface of the outer frame.

11. The valve body group according to claim 10, wherein the annular projection frame is inclined in the thickness direction.

12. The valve body group according to claim 11, wherein the annular projection frame of the outflow side valve body is inclined in an opposite direction to the direction in which the annular projection frame of the inflow side valve body is inclined.

* * * * *